[12] United States Patent
Townsend et al.

(10) Patent No.: US 7,430,760 B2
(45) Date of Patent: *Sep. 30, 2008

(54) SECURITY-RELATED PROGRAMMING INTERFACE

(75) Inventors: Steven Townsend, Seattle, WA (US); Thomas Fakes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 822 days.

This patent is subject to a terminal disclaimer.

(21) Appl. No.: 10/729,823

(22) Filed: Dec. 5, 2003

(65) Prior Publication Data

US 2005/0125687 A1 Jun. 9, 2005

(51) Int. Cl.
G06F 9/00 (2006.01)

(52) U.S. Cl. .............................. 726/13; 726/12; 726/14
(58) Field of Classification Search ............... 726/12–14
See application file for complete search history.

(56) References Cited

U.S. PATENT DOCUMENTS

| 4,104,721 | A | 8/1978 | Markstein et al. |
| 4,970,504 | A | 11/1990 | Chen |
| 6,006,328 | A | 12/1999 | Drake |
| 6,119,236 | A | 9/2000 | Shipley |
| 6,158,010 | A | 12/2000 | Moriconi et al. |
| 6,173,404 | B1 | 1/2001 | Colburn et al. |
| 6,178,173 | B1 | 1/2001 | Mundwiler et al. |
| 6,301,668 | B1 | 10/2001 | Gleichauf et al. |
| 6,408,391 | B1 | 6/2002 | Huff et al. |
| 6,513,721 | B1 | 2/2003 | Salmre et al. |
| 6,530,024 | B1 | 3/2003 | Proctor |
| 6,606,710 | B2 * | 8/2003 | Krishnan et al. .............. 726/13 |
| 6,684,244 | B1 | 1/2004 | Goldman et al. |
| 6,789,202 | B1 * | 9/2004 | Ko et al. ....................... 726/23 |
| 6,910,135 | B1 | 6/2005 | Grainger |
| 7,000,247 | B2 | 2/2006 | Banzhof |
| 7,010,807 | B1 | 3/2006 | Yanovsky |
| 7,093,292 | B1 * | 8/2006 | Pantuso ....................... 726/23 |
| 2003/0065942 | A1 | 4/2003 | Lineman et al. |
| 2003/0204632 | A1 | 10/2003 | Willebeek-LeMair et al. |
| 2003/0236994 | A1 | 12/2003 | Cedar et al. |
| 2004/0003266 | A1 | 1/2004 | Moshir et al. |
| 2004/0015719 | A1 | 1/2004 | Lee et al. |
| 2004/0064731 | A1 | 4/2004 | Nguyen et al. |
| 2004/0139004 | A1 | 7/2004 | Cohen et al. |
| 2004/0260945 | A1 | 12/2004 | Raikar et al. |
| 2005/0044418 | A1 | 2/2005 | Miliefsky |
| 2005/0125694 | A1 | 6/2005 | Fakes et al. |
| 2005/0262362 | A1 | 11/2005 | Patrick et al. |

OTHER PUBLICATIONS

Balasubramaniyan, et al., "An Architecture for Intrusion Detection using Autonomous Agents," 14th IEEE Computer Security Applications Conference, Dec. 1998, 12 pages.

(Continued)

*Primary Examiner*—Pramila Parthasarathy
(74) *Attorney, Agent, or Firm*—Lee & Hayes, PLLC

(57) ABSTRACT

A programming interface includes a first group of functions related to communicating a new security policy to multiple security engines. Each of the multiple security engines is configured to replace an existing security policy with the new security policy. The programming interface also includes a second group of functions related to communicating an indication of each security engine's readiness to implement the new security policy.

30 Claims, 13 Drawing Sheets

OTHER PUBLICATIONS

Caldwell, "The Importance of Event Correlation for Effective Security Management," Information Systems Control Journal, vol. 6, 2002, pp. 36-38.

Krugel, et al., "Decentralized Event Correlation for Intrusion Detection," ICICS 2001, vol. 2288, Dec. 6-7, 2001, pp. 114-131.

Montesi, "A Transaction Transformation Approach to Active Rule Processing," Proceedings of the Eleventh International Conference on Data Engineering, 1995, pp. 109-116.

Montesi, "Analysis and Optimization of Active Databases," Data & Knowledge Engineering, vol. 40, No. 3, Mar. 2002, pp. 241-271.

Park, et al., "Mini-Savepoints: Firewall for Atomic Updates," Database Systems for Advanced Applications '97, Proceedings of the Fifth International Conference, Apr. 1-4, 1997, pp. 293-302.

"Database Two Phase Commit Software Technology Review", retrieved on Sep. 30, 2007, at <<http://web.archive.org/web/20020219183616/www.sei.smu.edu/str/descriptions/dtpc_body.html>>, Carnegie Mellon University, 2001, pp. 5.

Date, "An Introduction to Database Systems", Addison Wesley Longman Inc., 2000, pp. 5.

Dubie, "LANDesk Punches up Patch Managment Suite", at <<http://www.networkworld/news/2003/0707patch.html>>, Network World, Jul. 2003, pp. 2.

Ulfelder, "Practical Patch Management", at <<http://www.networkworld.com/supp/security2/patch.html>>, Network World, Oct. 2002, pp. 8.

* cited by examiner

SECURITY-RELATED PROGRAMMING INTERFACE

TECHNICAL FIELD

The systems and methods described herein relate to computing systems and, more particularly, to an interface associated with processing events, such as security-related events, and other information.

BACKGROUND

Computer systems are continuing to grow in popularity and are frequently interconnected with other computer systems via networks, such as local area networks (LANs) and the Internet. Features such as electronic mail (email), instant messaging, and online entertainment encourage the use of computer systems coupled to networks. These features allow users to, for example, communicate with other users, retrieve audio and/or video content, and purchase products or services via online sources.

This increased interconnection of computer systems increases the likelihood of attacks against the computer systems by malicious users. These attacks may include installing a malicious program onto other users' computers (e.g., intended to disable the other users' computers, to obtain information from the other users' computers, launch attacks against other computers, and the like). Attacks may also include attempting to disable a computer such that its performance is greatly impaired (e.g., by generating a continuous stream of requests sent to the computer). These attacks can be a nuisance to the computer user and may result in lost data, corrupted data, confidential data being copied from the computer, or rendering the computer inoperable.

To prevent or minimize the severity of such attacks, various security programs and services have been developed. These programs and services execute on the computer system and protect the computer system from malicious attacks. Example programs include antivirus programs and firewall programs. Typically, these programs or services are directed toward preventing a particular type of attack. For example, an antivirus program protects against the loading and/or execution of computer viruses, and a firewall program protects against unauthorized access to the computer by an outside user.

These different programs do not typically communicate with one another. For example, an antivirus program does not typically communicate the fact that a virus was detected to the firewall program. Thus, the various security programs in a computer system may not learn of certain attacks on the computer system. It would be desirable to provide an interface that permits the communication of security policies and event information among various components and security programs in a computer system.

SUMMARY

The systems and methods described herein provide an interface associated with processing events and other information to enhance the security of a computing system. In a particular embodiment, a programming interface includes a first group of functions related to communicating a new security policy to multiple security engines. Each of the multiple security engines is capable of replacing an existing security policy with the new security policy. The programming interface also includes a second group of functions related to communicating an indication of each security engine's readiness to implement the new security policy.

BRIEF DESCRIPTION OF THE DRAWINGS

Similar reference numbers are used throughout the figures to reference like components and/or features.

DETAILED DESCRIPTION

The systems and methods discussed herein process various information, such as events generated by one or more programs or services. Further, an interface is described that permits the communication of information, such as security-related information, among various components and programs in a computing system. The computing system includes an event manager that receives events and other information from multiple sources, such as security engines and other computing systems. Example security engines include antivirus engines, firewall engines and intrusion detection engines. The event manager communicates event information received from a particular source to one or more security engines that might use the information to improve the level of security provided for the computing system.

Although particular examples discussed herein refer to security-related events and other security-related information, alternate embodiments may process any type of event or information. This information includes any information that might be utilized by security-related components in a host computer. Alternate embodiments can receive, process and distribute information that is not necessarily related to the security of the host computer. The terms "interface", "program interface" and "application program interface (API)" are used interchangeably herein.

Event Processing

Figure 1:
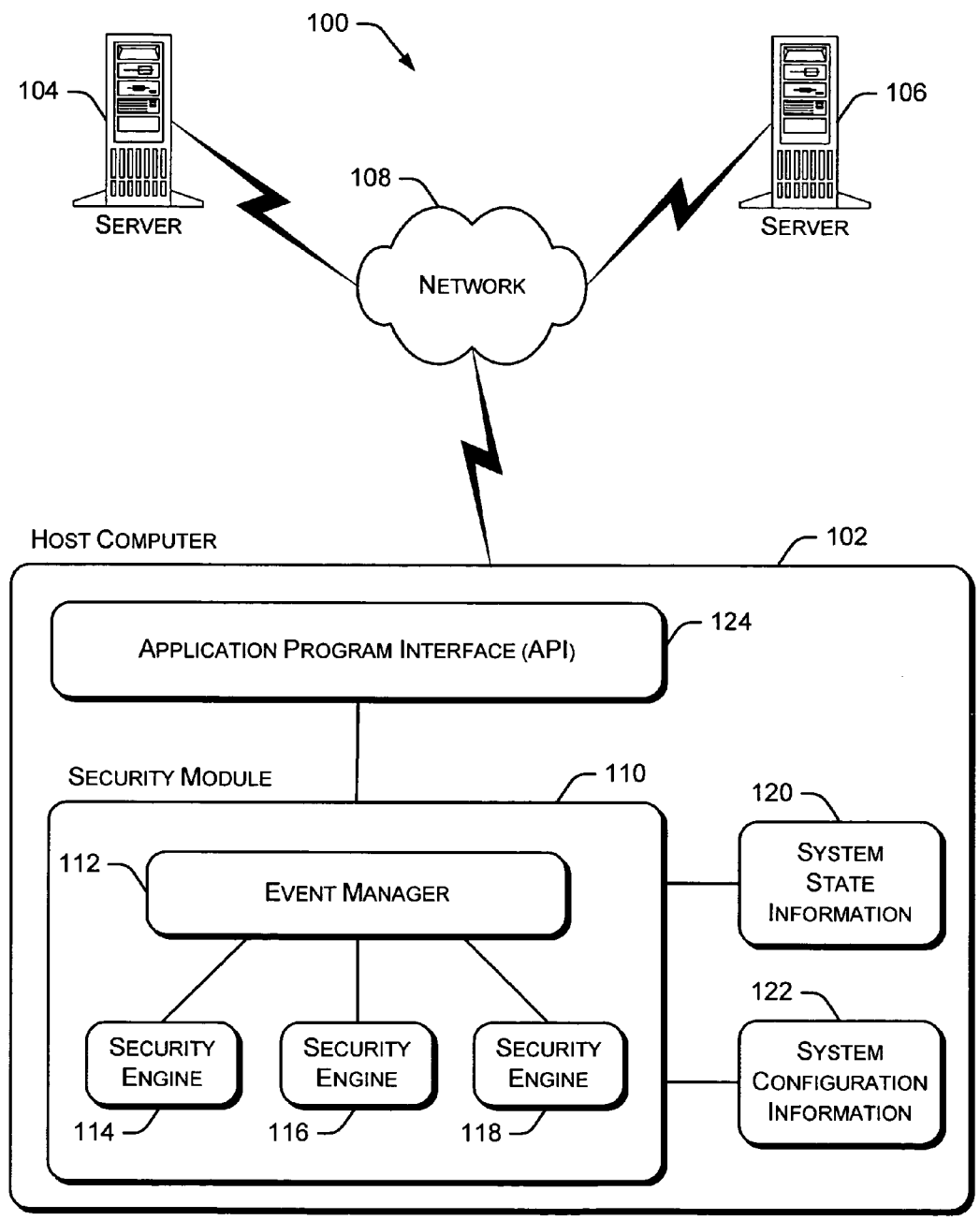
FIG. 1 illustrates an example environment in which various events are generated and processed.

FIG. 1 illustrates an example environment 100 in which various events are generated and processed. Events include, for example, detection of a computer virus, detection of an attempt to access confidential data, notification that a computer virus was destroyed, notification that a particular application program was halted or prevented from executing, changes to system state information, and so forth. A host computer 102 is coupled to multiple servers 104 and 106 via a network 108. Host computer 102 and servers 104 and 106 may be any type of computing device, such as the device discussed below with respect to FIG. 9. Network 108 can be any type of data communication network, such as a local area network (LAN), wide area network (WAN); the Internet, and the like. Although FIG. 1 show host computer 102 coupled to two servers 104 and 106, host computer 102 may be coupled to any number of servers or other devices capable of communicating with the host computer.

Environment 100 can represent any of a variety of a settings, such as networks in home, business, educational, research, etc. settings. For example, server 104 may be a server device on a corporate LAN, and host computer 102 may be a desktop or portable computing device on the corporate LAN. By way of another example, server 104 may be a server device on the Internet, and host computer 102 may be a desktop computing device at a user's home.

Host computer 102 includes a security module 110 that performs various security-related functions, such as monitoring, detecting and responding to attacks on host computer 102. Security module 110 includes an event manager 112 that is coupled to three security engines 114, 116 and 118. A security engine can be any service that assists in protecting against malicious users and/or malicious programs. Security engines 114-118 may be implemented in hardware or a combination of software and hardware. Particular security engines are security-related application programs, such as antivirus programs and intrusion detection programs. Security engines 114-118 may also be referred to as "services". A particular security module 110 may include any number of security engines coupled to event manager 112. Security module 110 may also include other modules, components, or application programs (not shown), such as a security-related policy reader or other policy-handling mechanism.

Security module 110 is also coupled to system state information 120 and system configuration information 122. System state information 120 includes information regarding the current operating state or operating mode of host computer 102. System configuration information 122 includes information regarding how host computer 102 is configured. System state information 120 and system configuration information 122 may be stored in a non-volatile storage device, such as a memory device or a hard disk drive. In one embodiment, event manager 112 and security engines 114-118 are capable of receiving system state information 120 and system configuration information 122.

Host computer 102 also includes an application program interface (API) 124 that permits the communication of security policies and event information among various components and programs in host computer 102 or other devices. For example, API 124 allows components or programs to communicate with security engines 114-118 or event manager 112 to send or receive security-related information. API 124 also facilitates, for example, loading new security engines, unloading existing security engines, sending security policies to security engines, communicating changes in data to security engines, user interaction with security engines, and centralized configuration management of security engines. Additional details regarding API 124 are discussed below.

Although not shown in FIG. 1, additional data sources or data providers may communicate information and events to security module 110 and event manager 112. This additional data includes, for example, configuration information related to an Internet Information Service (IIS), data provided by an system management application, data contained in a system registry, and information provided by a user or administrator of the system.

Each security engine 114-118 performs certain security-related functions to help secure host computer 102 from malicious users or application programs. These malicious users or application programs may attempt to disable host computer 102 or disable functionality of host computer 102, obtain data from host computer 102 (such as passwords or other confidential information), or use host computer 102 (such as to assist in attacking other computer systems). For example, security engine 114 detects computer viruses, security engine 116 provides firewall protection, and security engine 118 blocks execution of particular application programs based on one or more user privileges or characteristics. In this example, security engine 114 protects host computer 102 from being infected by computer viruses, worms, Trojan horses, and the like. Additionally, firewall protection includes protecting host computer 102 from being accessed over a network connection by other devices. Blocking execution of particular application programs includes preventing execution of application programs on host computer 102 by a user that does not have appropriate privileges. Additionally, execution of an application program may be blocked if improper behavior is detected, such as improper network access or improper storage device access.

In other embodiments, one or more security engines may perform intrusion detection or vulnerability analysis. Intrusion detection includes, for example, identifying when a malicious application program and/or user has accessed host computer 102 and taking appropriate action to notify a user or administrator, attempt to disable the malicious application program, or halt the malicious user's access. Vulnerability analysis includes, for example, attempting to detect vulnerabilities in host computer 102 due to security engines or other components that have not been installed or updated correctly, security engines or other components that have not been configured properly, patches or hot fixes that have not been installed, passwords that do not comply with required lengths or required characters, and the like. A particular security engine 114-118 may be unaware of the existence and functionality of other security engines coupled to event manager 112.

Each security engine 114-118 communicates events (e.g., detection of a computer virus, detection of an attempt to retrieve data from host computer 102, or preventing execution of an application program by a user) to event manager 112. These events include information collected by a security engine, actions taken by a security engine, data collected by the event manager from one or more data sources, and the like. Example information includes a listing of all virtual servers instantiated in a particular installation. Event manager 112 processes these events and communicates the information contained in particular events to other security engines 114-118 that may benefit from such information.

Security module 110 also receives security-related policies that include one or more rules and various data. Event manager 112 distributes the rules to the appropriate security engines 114-118 and provides data to the security engines, as needed. Each security engine 114-118 stores these rules and data received from event manager 112. The operation of security module 110, event manager 112 and security engines 114-118 is discussed in greater detail below.

Figures 2, 3:
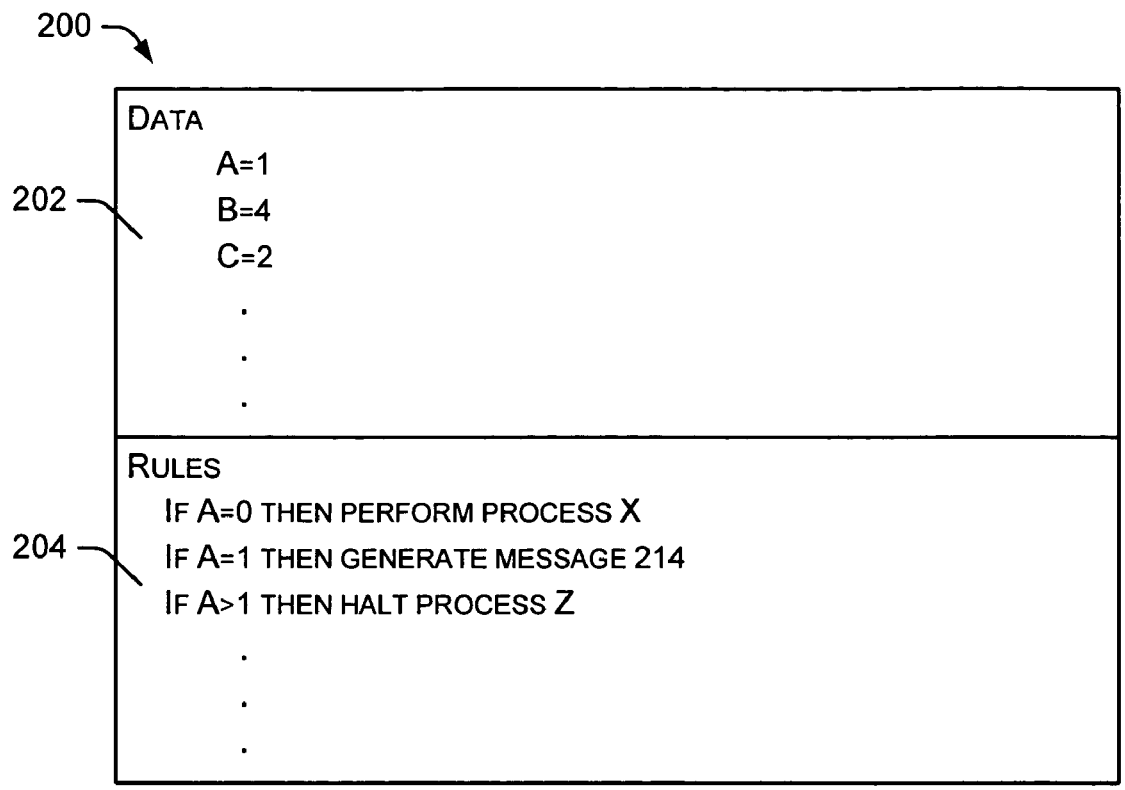
FIG. 2 illustrates an example security policy containing data and rules.
FIG. 3 illustrates an example table maintained by a security module regarding data requested by various security engines.

FIG. 2 illustrates an example security policy 200 containing data and rules. In one embodiment, security policy 200 is stored in security module 110. A particular security module may receive and store any number of different security policies 200 received from any number of different data sources. Alternatively, security policy 200 may be stored in another module or component within host computer 102. In the example of FIG. 2, a data portion 202 of security policy 200 includes one or more data elements. As shown in FIG. 2, these data elements include values assigned to variables (e.g., a value of "1" is assigned to variable "A" and a value of "4" is assigned to variable "B"). In alternate embodiments, other types of data may be included instead of or in addition to the data shown in FIG. 2. The data contained in security policy 200 is used, for example, by one or more rules contained in security policy 200 or contained in one or more other security policies.

Security policy 200 also includes a rules portion 204 that contains multiple rules. The rules in security policy 200 may be associated with one or more security engines. For example, certain rules may only be applied by particular security engines. The rules may be arranged in security policy 200 based on the security engine with which the rules are associated. Alternatively, an identifier associated with each rule may identify the security engines that are capable of applying the rule. In particular embodiments, a rule may be associated with any number of security engines. In other embodiments, a host computer may not contain a security engine that applies a particular rule. In this situation, the rule is not associated with any security engine.

In the example of FIG. 2, the rules are defined using an IF-THEN structure. Alternatively, the set of rules can take a variety of different forms. Using the IF-THEN structure shown in FIG. 2, the rule defines a particular condition(s) and a corresponding particular action(s) or result(s). During enforcement of the rule, if that particular condition(s) is detected, then the corresponding particular action(s) or result(s) is performed. A rule can identify a variety of different conditions and corresponding actions or results. Example conditions include attempts to access a resource (e.g., memory locations, network addresses or ports, other programs, or files on a storage device), attempts to write data to particular locations (e.g., particular memory locations, or particular locations on a storage device), attempts to run particular programs, and various aspects of the current operating state of host computer 102. Example results include preventing a resource from being accessed, preventing data from being written to particular locations, preventing a program from being executed, or generating a notification that the occurrence of the condition in the rule was detected (e.g., recording its occurrence in a log, or sending a message to a user or other computer). The particular results can also be permissive in nature rather than preventive. For example, the results could indicate that a particular resource or location can be accessed only if the condition in the rule is satisfied by host computer 102, or that a particular program can only be run if the condition in the rule is satisfied by host computer 102.

Additional examples of rules include permitting certain application programs or services to update data files in a particular directory or folder, enabling receipt of traffic on port 21 if file transfer protocol (FTP) is enabled, and generating a virus warning message if a particular virus signature is detected. Other examples include generating an event if a particular application program has not been upgraded to a particular revision level, preventing access to a network if the application program has not been upgraded to a minimum revision level, and preventing the host computer from receiving data via network port 35.

FIG. 3 illustrates an example table 300 maintained by a security module regarding data requested by various security engines. In one embodiment, table 300 is stored in security module 110. Alternatively, table 300 may be stored in another module or component within host computer 102. Each time a security engine requests data from the security module, the security module updates the table (if necessary) to include that data request. A first column 302 of table 300 identifies a particular data element, such as a variable or other identifier or information. A second column 304 of table 300 identifies any security engines that previously requested the associated data element. For example, table 300 identifies that data element "A" was previously requested by security engine "1". Similarly, data element "D" was previously requested by security engines "1", "4" and "6". As discussed in greater detail below, the information contained in table 300 is used by the security module to determine which security engines should receive updated data.

Figure 4:
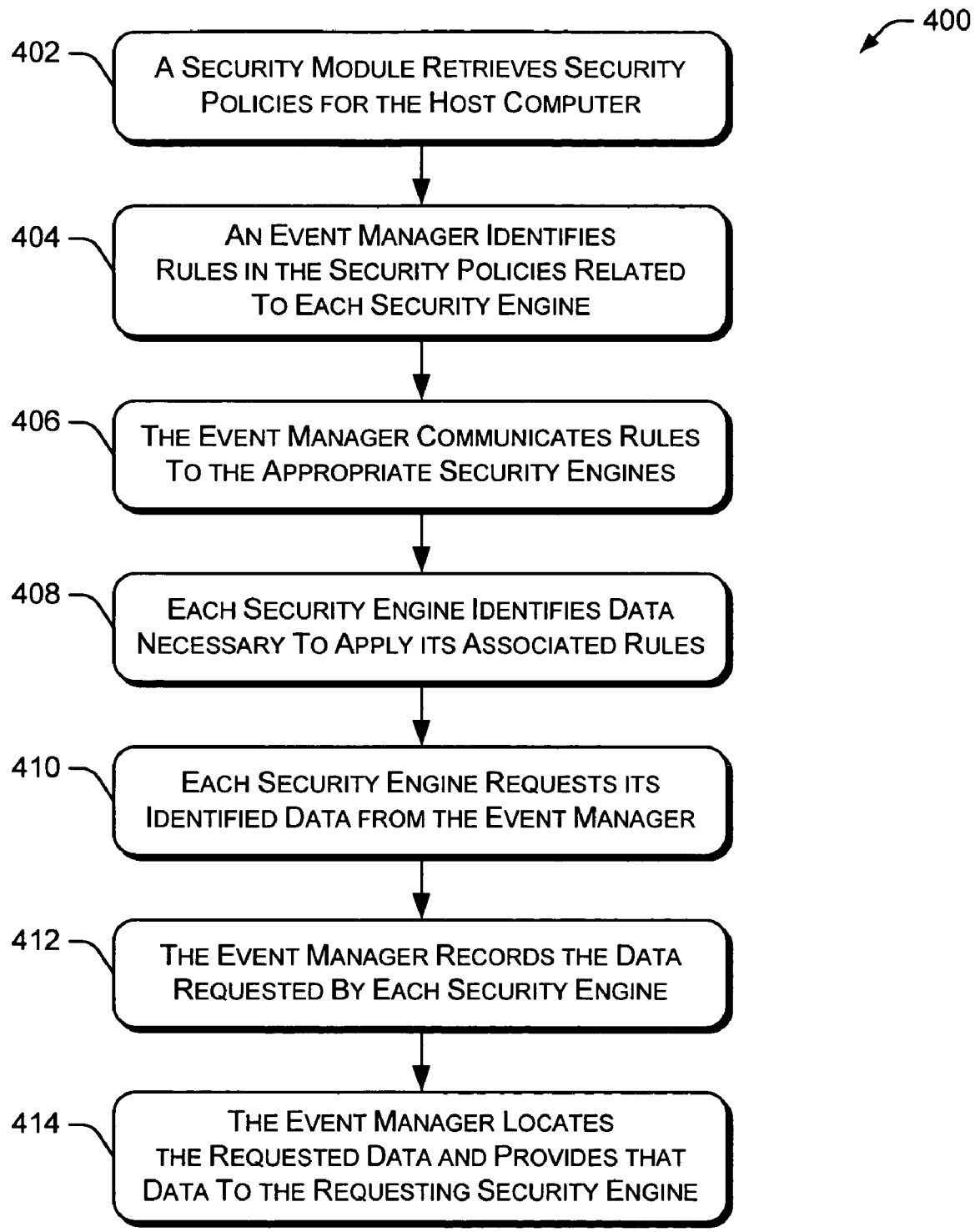
FIG. 4 is a flow diagram illustrating an embodiment of a procedure for retrieving and distributing security policy rules and data.

FIG. 4 is a flow diagram illustrating an embodiment of a procedure 400 for retrieving and distributing security policy rules and data. Procedure 400 may be performed, for example, upon initialization of a host computer. Initially, a security module retrieves security policies for the host computer (block 402). A event manager identifies rules in the security policies related to each security engine (block 404). The event manager then communicates the rules to the appropriate security engines (block 406).

Each security engine identifies data necessary to apply its associated rules (block 408), for example by identifying data elements contained in rules that the security engine will apply. Each security engine then requests its identified data from the event manager (block 410). After receiving a data request from a security engine, the event manager records the requested data element in a table (e.g., table 300 in FIG. 3) or other data structure for future reference (block 412). Finally, the event manager locates the requested data and provides that data to the requesting security engine (block 414). Thus, rather than providing all data to all security engines, the event manager provides the requested data to each requesting security engine.

Figure 5:
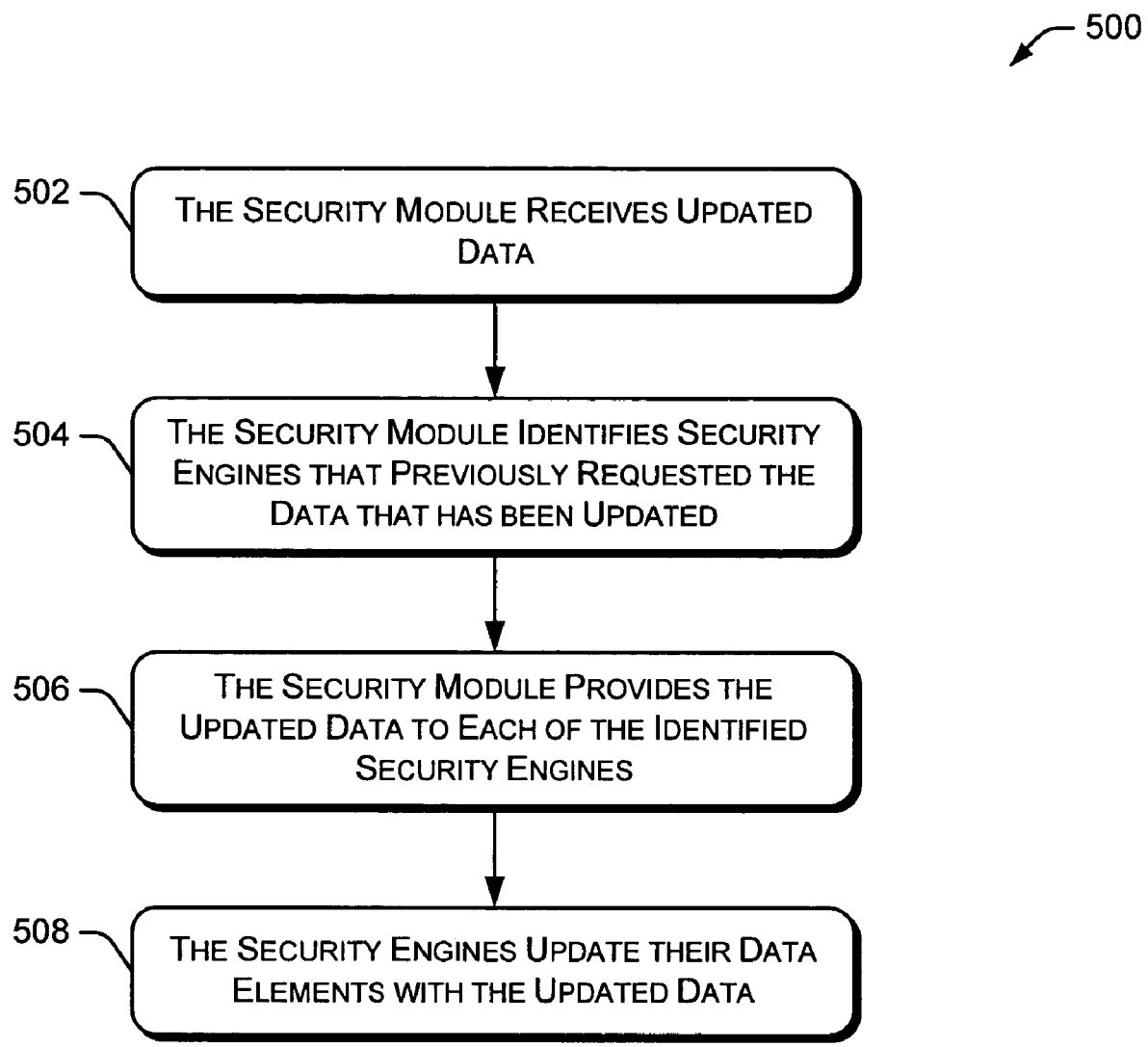
FIG. 5 is a flow diagram illustrating an embodiment of a procedure for handling updated security policy data.

FIG. 5 is a flow diagram illustrating an embodiment of a procedure 500 for handling updated security policy data. Initially, the security module receives updated data (block 502). For example, the updated data may include updated values for existing variables. The security module identifies one or more security engines that previously requested the data that has been updated (block 504). In one embodiment, the security module identifies these security engines using a table such as table 300 shown in FIG. 3. After identifying the appropriate security engines, the security module provides the updated data to each of the identified security engines (block 506). Finally, the security engines update their data elements with the updated data. Procedure 500 is repeated each time the security module receives updated data. In another embodiment, the security module periodically checks various data sources for updated data. If the data has been updated, the security module retrieves the updated data and distributes the data according to procedure 500.

In one embodiment, when a rule is updated, the security module identifies the security engines associated with the rule and distributes the updated rule to the identified security engines. If a new rule is received, the security module identifies the security engines that might use the new rule and distributes the new rule to the appropriate security engines. Similarly, if an existing rule is deleted, the security module deletes the rule from all security engines associated with the rule. In another embodiment, when a rule is updated, the security module creates a new set of rules (including the updated rule) and distributes the new set of rules to the security engines, thereby replacing the existing rules contained in the security engines.

Figure 6:
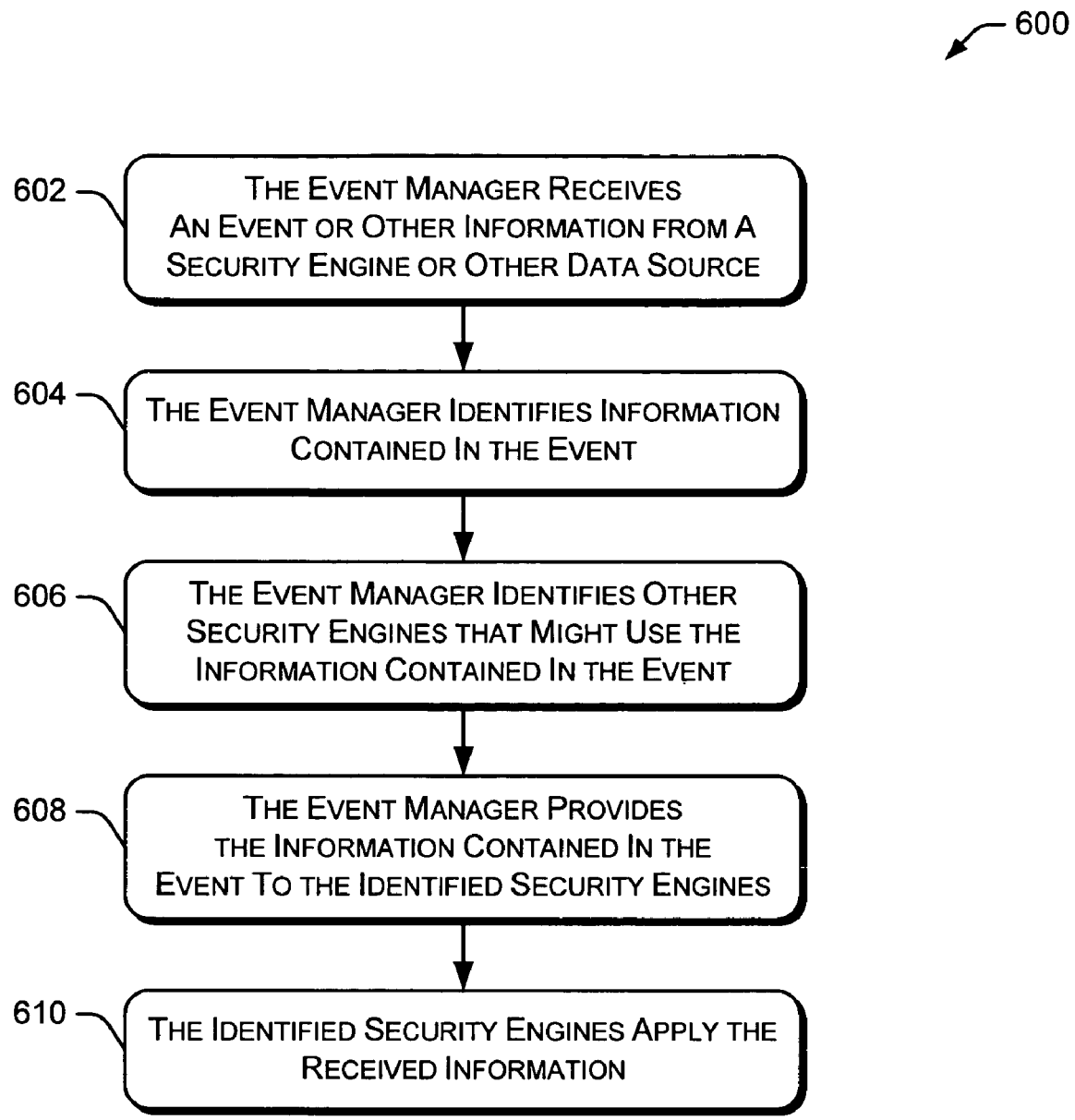
FIG. 6 is a flow diagram illustrating an embodiment of a procedure for handling the distribution of information to one or more security engines.

FIG. 6 is a flow diagram illustrating an embodiment of a procedure 600 for handling the distribution of information, such as event information or system state information, to one or more security engines. Initially, the event manager receives an event from a security engine (block 602). The event manager then identifies information contained in the event (block 604), such as the event type or the nature of the attack that generated the event. The event manager also identifies other security engines that might use the information contained in the event (block 606). The relationships among different security engines are specified, for example, in the security policy received by the host computer. These relationships may be defined wholly or in part by a system administrator or other system operator when creating the security policy.

Next, the event manager provides the information contained in the event to the identified security engines (block 608). The identified security engines then apply the received information (block 610). This sharing (or correlation) of event information enhances the level of security provided by a host computer against malicious attacks. Sharing of the event information is handled by the event manager such that the individual security engines do not need to know of the other security engines contained in the host computer. The security-related information discussed herein can be stored in a central location, thereby allowing other devices, components and application programs to access the information. For example, other security engines or computing systems may access the stored security related information.

In one example of procedure 600, an antivirus security engine detects repeated attempts to access a network via a particular port. The antivirus security engine reports this information (e.g., dates and times of the attempted access and the port on which access was attempted) to the event manager. In this example, the antivirus security engine is not responsible for responding to such access attempts. The event manager receives the information from the antivirus security engine and determines that an intrusion detection security engine and a firewall security engine may use such information. After receiving the information, the intrusion detection security engine and the firewall security engine may adjust their operation based on the received information. For example, the intrusion detection security engine may increase the frequency with which it checks for intruders. Additionally, the firewall security engine may temporarily disable the port on which access was attempted. Thus, the overall security of the host computer against attacks is increased by allowing security engines to adjust their operation based on shared information regarding security-related events.

In another example of procedure 600, a vulnerability security engine detects whether a particular patch is installed on the host computer. If the patch is not installed, the vulnerability security engine generates an event indicating that the patch is not installed. A host firewall security engine and a behavioral blocking security engine have registered with the event manager for notification if the patch is not installed. When the host firewall security engine and the behavioral blocking security engine receive notification of the patch not being installed, the security engines enforce rules that limit the functionality (or prevent execution) of the application program that was not patched.

In another embodiment, system state information is shared among various components (e.g., the event manager and multiple security engines) in the security module. The system state information may be provided by various data sources. Example system state information includes a current network state, whether a network connection is wired or wireless, whether the host computer is accessing a corporate network or an unknown network, and host computer configuration information. Thus, if a security engine identifies particular system state information, that identified information can be shared among other security engines and other components or modules in the host computer.

In a particular embodiment, the system state information collected by various components is stored in a central location, thereby providing access to the information by other devices, components and application programs. For example, system state information collected by one security engine is accessible by other security engines, security modules and computing systems.

Security Policy Updates

As discussed above, a security policy can be used to describe the rules that are to be applied, for example, by security engines or security providers. When changes are made to the security policy, updated rules are supplied to the various security engines, and these various security engines change over to start using the updated rules at substantially the same time.

In addition to the components, programs and modules discussed above with respect to FIG. 1, host computer 102 receives security policies from one or more source devices, such as servers 104 and 106. The security policies describe how various security engines on host computer 102 should operate. Although only one host computer 102 is illustrated in FIG. 1, it is to be appreciated that multiple host computers 102 can obtain security policies from the same source device.

Example source devices include desktop or workstation computing devices, server computing devices, portable or handheld computing devices, game consoles, network appliances, cellular phones, personal digital assistants (PDAs), networking devices (e.g., routers, gateways, firewalls, wireless access points, etc.), and so forth.

Host computer 102 may also include a policy reader module, a rule manager, a rule set generator module, and a dynamic rules data store. It is to be appreciated that one or more of these modules may be combined into a single module, and/or one or more of these modules may be separated into two or more modules.

Generally, to update the security policy being enforced by security engines 114-118, the policy reader obtains a security policy from a source device. The rule set generator uses the newly obtained security policy to generate, for each of the various security engines, a set of one or more rules and associated data. These sets of rules are then communicated to the various security engines, and the associated data is stored in the dynamic rules data store. The associated data can also be communicated to the security engines. Upon receiving the set of one or more rules, each security engine processes the new set of rules, getting ready to begin using the new set of rules. However, each security engine continues to use its current set of rules until instructed to change to the new set. A rule manager instructs all of the security engines to change to the new set of rules after the rule manager receives an indication from each of the security engines that it is ready to change to the new set of rules.

In certain embodiments, the rule manager coordinates the updating of security policies in host computer 102. The rule manager receives the indications from the various security engines that indicate the security engines are ready to change to the new set of rules, and gives an indication to the security engines when they should begin using the new set of rules.

The policy reader module obtains a new security policy from the source device. The policy reader module may be configured to check whether a new security policy is available from the source at regular or irregular intervals, or alternatively may receive an indication from some other component (e.g., the rule manager, the source device, or some other device not shown in FIG. 1, that it should obtain a new security policy from the source (or check whether a new security policy is available from the source). The policy reader may identify to the source a particular security policy that the policy reader desires to obtain, or alternatively may merely request the most recent security policy for the host computer from the source. A comparison between the current security policy being used by the host computer and the most recent security policy may be made to determine whether the most recent security policy is already being enforced on the host computer. Such a comparison could be made by the source, the policy reader, or alternatively by some other component.

When the new security policy is obtained from the source, the rule set generator generates a set of rules for each of the different security engines 114-118. Different security engines may use different rules when enforcing the security policy on host computer 102. For example, one security engine 114 may be a firewall whereas another security engine 116 may be an antivirus component. The security policy may identify rules that are specific to the antivirus engine (and thus the firewall engine need not be concerned with them), and may also identify rules that are specific to the firewall engine (and thus the antivirus engine need not be concerned with them).

In certain embodiments, the security policy itself is a list of rules and associated data. The security policy may also include an indication of which rules and data are for which security engines, or alternatively no such indication may be included (e.g., relying on the host computer to determine which rules are for which security engines). The security policy allows designers to have a single record or file of all the rules involved in the protection of the host computer, without having to separate the rules across different records or files for the different security engines.

Additionally, using the techniques described herein, new security policies can be prepared by designers that shift responsibility for protecting against particular attacks from one security engine to another. For example, protection against a particular type of attack may be enforced by an antivirus program in one security policy but changed to being enforced by a firewall program in a new security policy. Using the techniques described herein, the designers can be confident that this shift in responsibility will occur in all of the security engines substantially concurrently, thereby reducing the vulnerability of the host computer to attacks during the shift.

The rule set generator identifies, based on the security policy, which rules and associated data (if any) are used by which of the security engines. For each security engine, the rule set generator generates a set of rules for that security engine and makes that generated set of rules available to that security engine (e.g., the set of rules may be transmitted or sent to the security engine, the security engine may be informed of a location in memory where the generated set of rules can be obtained, etc.). This generation can be performed in a variety of different manners. For example, a new set of rules may be generated by the rule set generator without regard for the current rules being enforced by the security engines. By way of another example, the current set of rules may be modified or changed to incorporate any differences between the current and new set of rules. Additionally, the rule set generator may simply copy the rules from the security policy, or alternatively the rule set generator may generate the rules based on information in the security policy that describes the rules.

In certain embodiments, the security policy identifies which rules are to be distributed to which security engines. For example, each rule may be associated with a particular label or identifier (e.g., Security Engine 1, or Antivirus engine, etc.). The rule set generator can use these identifiers in generating the sets of rules for the various security engines. In alternate embodiments, the rule set generator may infer which rules are to be distributed to which security engines. In other embodiments, a combination of these techniques may be used (e.g., for some rules the security policy may identify which security engine they are to be assigned to, and for other rules the security policy generator may infer which security engine they are to be assigned to).

The set of rules generated by the rule set generator can take any of a variety of different forms. In certain embodiments, the rules follow an if-then structure as discussed above. Using this structure, the rule defines a particular condition(s) and a corresponding particular action(s) or result(s). During enforcement of the rule, if that particular condition(s) is detected then the corresponding particular action(s) or result(s) is performed. Any of a variety of conditions and corresponding results can be identified by a rule. Examples of particular conditions include: attempts to access particular resources (e.g., memory locations, network addresses or ports, other programs, files on a storage device, and so forth), attempts to write data to particular locations (e.g., to particular memory locations, to particular locations on a storage device, etc.), attempts to run particular programs, various aspects of the current operating state of the host computer (e.g., resources available, programs running, etc.), and so forth. Examples of particular results include: preventing a resource from being accessed, preventing data from being written to particular locations, preventing a program from being run, generating a notification that the occurrence of the condition in the rule was detected (e.g., recording its occurrence in a log, sending a message to a user or other computer, and so forth). The particular results can also be permissive in nature rather than preventive. For example, the results could indicate that a particular resource or location can be accessed only if the condition in the rule is satisfied by the host computer, or that a particular program can be run only if the condition in the rule is satisfied by the host computer.

In certain embodiments, host computer 102 includes a dynamic rules data store which is the data associated with the various rules being enforced by the security engines. In certain embodiments, the dynamic rules data store may include two sets of data: one set for the current rules being enforced by the security engines, and another set for the new rules that the security engines are being updated to enforce. When a new security policy is received, the rule set generator updates the dynamic rules data store with the data associated with the sets of new rules passed to the security engines.

Each security engine includes a rule change module that receives a set of one or more rules from the rule set generator. The data associated with the rules may be received from the rule set generator along with the rules, or alternatively the rule change module may obtain the data it desires from the dynamic rules data. Additionally, it should be noted that although the rule set generator is discussed above as generating a set of rules for each security engine based on the security policy, alternatively each security engine may receive the entire security policy (or most of the security policy) and generate their own set of rules rather than receiving the set from the rule set generator.

The rule change module processes the new set of rules as needed in order to generate new internal rules that enforce the new policy. The processing of the new set of rules to generate new internal rules refers to whatever actions are necessary for the security engine to take in order to place the new set of rules in a state that they can be enforced by the security device. For example, this processing may include converting the new set of rules to an internal format, storing rules in particular memory locations, organizing rules into a particular arrangement or order, etc. The rule change module may generate new rules in any of a variety of manners; the rule change module may keep the rules in the same format as they were received from the rule set generator or alternatively convert the rules to an internal format use by the security engine.

Regardless of how the new rules are generated, each security engine maintains a current set of rules which enforce the previous security policy for the host computer (the security policy which is being updated). While generating the new rules, and even after the new rules are generated, the security engine continues to enforce the current rules. The security engine does not begin enforcing the new rules until instructed to do so (e.g., by the rule manager).

After the rule change module has finished generating the new rules, the rule change module indicates to the rule manager that it has finished and is ready to switch to using the new rules (and thus begin enforcing the new security policy). After the rule manager has received such an indication from all of the security engines, the rule manager instructs each of the security engines to begin using the new rules. The rule manager waits to instruct each of the security engines to begin using the new rules until after the rule manager receives the indication from all of the security engines. Once instructed to do so, each security engine begins using the new rules. As soon as a security engine begins using the new rules, it can delete the rules it was previously using.

In some situations, a security engine may fail in processing the new rules. In such situations, the security engine returns an indication of such failure to the rule manager. Alternatively, the rule manager may impose a time limit on responses from the security engines. If all security engines have not responded with an indication that they are ready to begin using the new rules within the time limit, the rule manager can assume that one or more of the security engines has failed in processing the new rules.

When the rule manager identifies that one or more of the security engines has failed in processing the new rules, the rule manager does not instruct any of the security engines to begin using the new rules. Rather, the rule manager sends an indication to abort the changeover to the new rules (this may also be referred to as a rollback). Such an abort or rollback indication informs each of the security engines that it is to ignore the new rules received from the rule set generator as well as any new rules resulting from its processing, and continue to use the current rules. In certain embodiments, the security engines can safely delete the new rules they generated (or are in the process of generating) in response to such an abort or rollback indication.

In certain embodiments, each security engine waits until it can nearly ensure that it can begin using the new rules before informing the rule manager that it is ready to begin using the new rules. In other words, the security engine waits to inform the rule manager that it is ready to begin using the new rules until the security engine is to the point in processing the new rules that it is virtually impossible for the security engine to fail to begin enforcing those rules when instructed to do so. In certain embodiments, this is accomplished by the security engine generating the new set of rules, and maintaining a pointer to which of the rule sets (old rules or new rules) it is to use. After the new set of rules is generated, the security engine indicates to the rule manager that the security engine is ready to begin using the new set of rules. Then, when instructed to begin using the new set of rules, the security engine can simply change its pointer from the old set of rules to the new set of rules. The security engine can nearly ensure that it can change its pointer and begin using the new rules. It is to be appreciated that "nearly ensure" does not require a 100% guarantee that failure is absolutely impossible. It is possible that certain situations could still arise that would result in failure (e.g., a power loss or virus attack that prohibits changing of the pointer). However, it is also to be appreciated that the chances of failure are very small.

The rule manager can instruct the security engines to begin using the new set of rules (also referred to as switching over to the new set of rules) in any of a variety of different manners. The manner that is used, however, should operate to inform all of the security engines at substantially the same time so that all of the security engines can begin using their new sets of rules at substantially the same time (also referred to herein as substantially concurrently). By having all of the security engines begin using their new sets of rules at substantially the same time, any vulnerability of the host computer due to the rule changeover is reduced. Generally, the closer in time that the security engines begin using their new sets of rules, the lesser the vulnerability during the changeover to the new set of rules. Following are some examples of ways in which the rule manager can instruct the security engines at substantially the same time to begin using their new sets of rules.

One way in which the rule manager can instruct the security engines to begin using the new set of rules is to use an event object that can be fired across all of the security engines at once. For example, each security engine, upon receipt of the new rules from the rule set generator, sets an internal flag to start polling a particular event each time the rules are accessed (during its normal operation of protecting the host computer). The rule manager can then instruct the security engines to begin using their new sets of rules by firing the event (the same one being polled by the security engines). So, after the event is fired, any subsequent polling of the event will reflect that the event has been fired and thereby inform the polling security engine that the new rule set should be used. For example, in response to detecting the event having been fired, the pointer in the security engine can be changed to point to the new set of rules.

In addition to polling the event, a thread may also be run by the security engine that waits on the event. When the event is fired, the thread detects the firing so that the security engine is informed that the new rule set should be used. For example, in response to the thread detecting that the event has fired, the pointer in the security engine can be changed to point to the new set of rules.

Once the event has been fired and the new set of rules is being used, the security engine can stop polling the event. Additionally, if a thread waiting on the event is run by the security engine, that thread can be terminated.

Another way in which the rule manager can instruct the security engines to begin using the new set of rules is to call a function exposed by each of the security engines (e.g., a "switch" function). Calling such a function of a security engine instructs that security engine to begin using the new set of rules. For example, in response to such a function being invoked on a security engine, the security engine changes its pointer to point to the new set of rules.

Another way in which the rule manager can instruct the security engines to begin using the new set of rules is to notify each of the security engines of a shared data structure that each security engine can access. The rule manager can inform each security engine of the shared data structure at different times, such as by calling a function on each security engine (e.g., an "identify data structure" function), or by identifying the shared data structure when the new rules are passed to the security engine. The shared data structure can take any of a variety of different forms, such as a location in memory (e.g., in random access memory (RAM) or a nonvolatile memory such as Flash memory), a file stored on a local or remote storage device, and so forth.

Each security engine checks this shared data structure (e.g., each time the rules are accessed (during its normal operation of protecting the host computer)) to determine its value. The rule manager can instruct each of the security engines to begin using the new rule set by changing the value(s) stored in the shared data structure. For example, the shared data structure may initially store a value of "previous" or a value of 0 to indicate that the current set of rules are to be used, and when it is time to switch to begin using the new rule set the rule manager can write a value of "new" or "switch" or a value of 1 to the shared data structure to indicate that the new set of rules are to be used.

As discussed above, the dynamic rules data store stores the data associated with the various rules being enforced by the security engines. As such, when the host computer is being updated to begin enforcing a new policy, the data used by the security engine may also change. This data can also change during the operation of the host computer (e.g., a security engine may later request data from or store data in the dynamic rules data store). In order for the proper data to be made available to the security engines, when updating the security policy the dynamic rules data store may operate in the same manner as a security engine. That is, two sets of rules data would be maintained—the first set would be used prior to the switch and the second set would be used after the switch. The new data would be stored in the dynamic rules data store, and the dynamic rules data store would return an indication to the rule manager when it is ready to begin using the new set of data. The dynamic rules data store then continues to use the previous set of data until receiving an instruction from the rule manager to begin using the new set of data.

It should be noted that the various components in the host computer can be implemented within the same application process executing on the host computer. For example, the policy reader, the rule manager, the dynamic rules data, the rule set generator, and the security engines may all be part of the same application process.

Alternatively, different components in the host computer can be implemented across two or more application processes executing on the host computer. For example, one or more security engines may run in a process that is separate from the other security engines as well as separate from the policy reader, the rule manager, the dynamic rules data, and the rule set generator. Allowing different components to run in different application processes allows, for example, different developers to design different plug-in components (e.g., different plug-in security engines) to enhance the security of the host computer. These additional plug-in components would be upgraded to enforce new policies in the same manner as other non-plug-in components.

When separating the components across multiple application processes, a mechanism is used to allow the various components to communicate with one another. This communication allows, for example, sets of new rules and data to be passed to security engines in different processes, data to be passed from security engines in different processes to the dynamic rules data, instructions to begin using the new sets of rules to be passed to security engines in different processes, and so forth. By way of example, the components discussed herein may be implemented as Component Object Model (COM) components. Additional information regarding the Component Object Model architecture is available from Microsoft Corporation of Redmond, Wash.

It should be noted that in the discussions herein, each security engine is instructed to begin using its new set of rules by the rule manager. Alternatively, this instruction may be implemented in other manners that still allow each security engine to begin using its new set of rules substantially concurrently. For example, rather than using the rule manager, a control mechanism to instruct each security engine to begin using its new set of rules may be distributed across the various security engines. This could be accomplished, for example, by each of the security engines notifying each other security engine that it is ready to begin using the new set of rules, with none of the security engines beginning to use its new set of rules until all of the security engines have notified all of the other security engines that they are ready to begin using the new set of rules.

Figure 7:
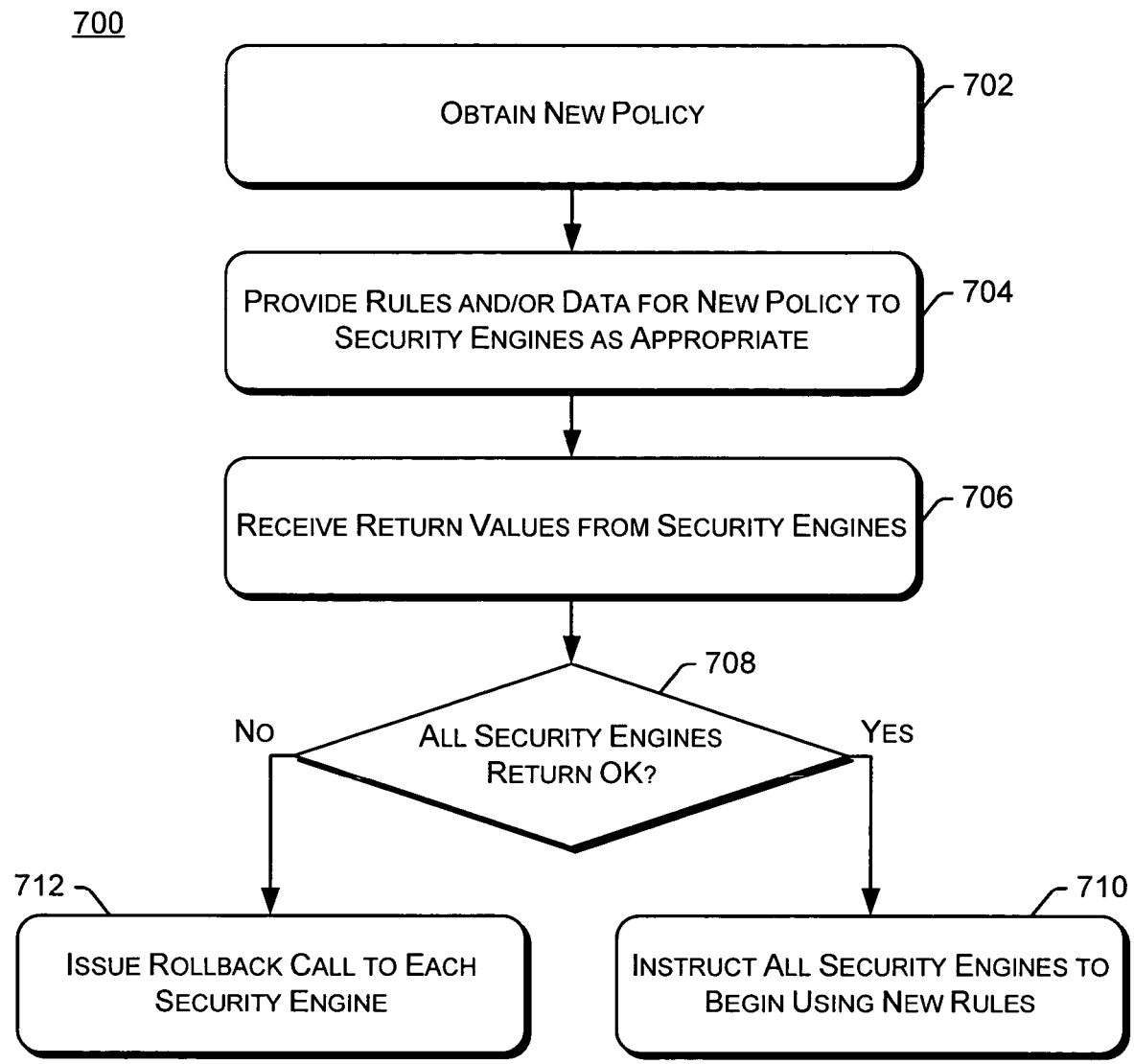
FIG. 7 is a flow diagram illustrating an embodiment of a procedure for updating a security policy.

FIG. 7 is a flowchart illustrating an example process 700 for updating a security policy. Process 700 is implemented by a component(s) that is coordinating the updating of the security policy on a host computer, such as the rule manager discussed herein. Process 700 may be performed in software, hardware, firmware, or combinations thereof.

Initially, a new policy to be enforced on the device is obtained (block 702). The policy may be obtained in a "pull" manner, where the host computer initiates the access to the source of the new policy to check whether a new policy is available from the source. The policy may alternatively be obtained in a "push" manner, where the host computer is informed of (e.g., sent a message or other indication of) the availability of a new security policy or of the new security policy itself.

Regardless of how the new policy is obtained, once the new policy is obtained a new set of rules and/or data associated with the rules for the new policy is provided to each of the security devices (block 704). As discussed above, different sets of rules and/or data can be generated based on the new policy for each security engine.

Return values are then received from the security engines (block 706). In certain implementations, each security engine returns, to the component implementing process 700, a value signifying "OK" or a value signifying "Fail". When a security engine returns a value signifying "OK" it indicates that the security engine has processed the set of rules and/or data that it received and is ready to begin using the new set of rules and/or data. This may also be referred to as a security engine's readiness to implement the new set of rules and/or data. For example, all that remains is for the security engine to change its pointer to point to the new set of rules rather than the previous set of rules. However, when a security engine returns a value signifying "Fail", it indicates that the security engine could not (or did not) process the set of rules and/or data and that the security engine is not able to begin using the new set of rules and/or data. Additionally, as discussed above a time limit (also referred to as a timeout value or a threshold amount of time) may be imposed on responses from security engines—if a security engine does not respond with a value signifying "OK" or "Fail" within this time limit the component implementing process 700 treats the security engine as if it had returned a value signifying "Fail".

It is to be appreciated that the sending of rules and the receiving of responses (blocks 740 and 706) is an asynchronous process. Different security engines may take different amounts of time to process the rules and/or data they receive, and process 700 simply waits until all of the security engines have finished their respective processing (up to any optional time limit that is imposed).

Process 700 proceeds based on whether all of the security engines have returned a value signifying "OK" (block 708). If all of the security engines have returned a value signifying "OK", then all of the security engines are ready to begin using the new set of rules, so all of the security engines are instructed to begin using the new set of rules block 710).

However, if at least one of the security engines does not return a value signifying "OK", then a rollback call is issued to each security engine (block 712). This rollback call essentially aborts the update process, so none of the security engines will begin to use the new set of rules yet (even those security engines that had returned a value signifying "OK").

Figure 8:
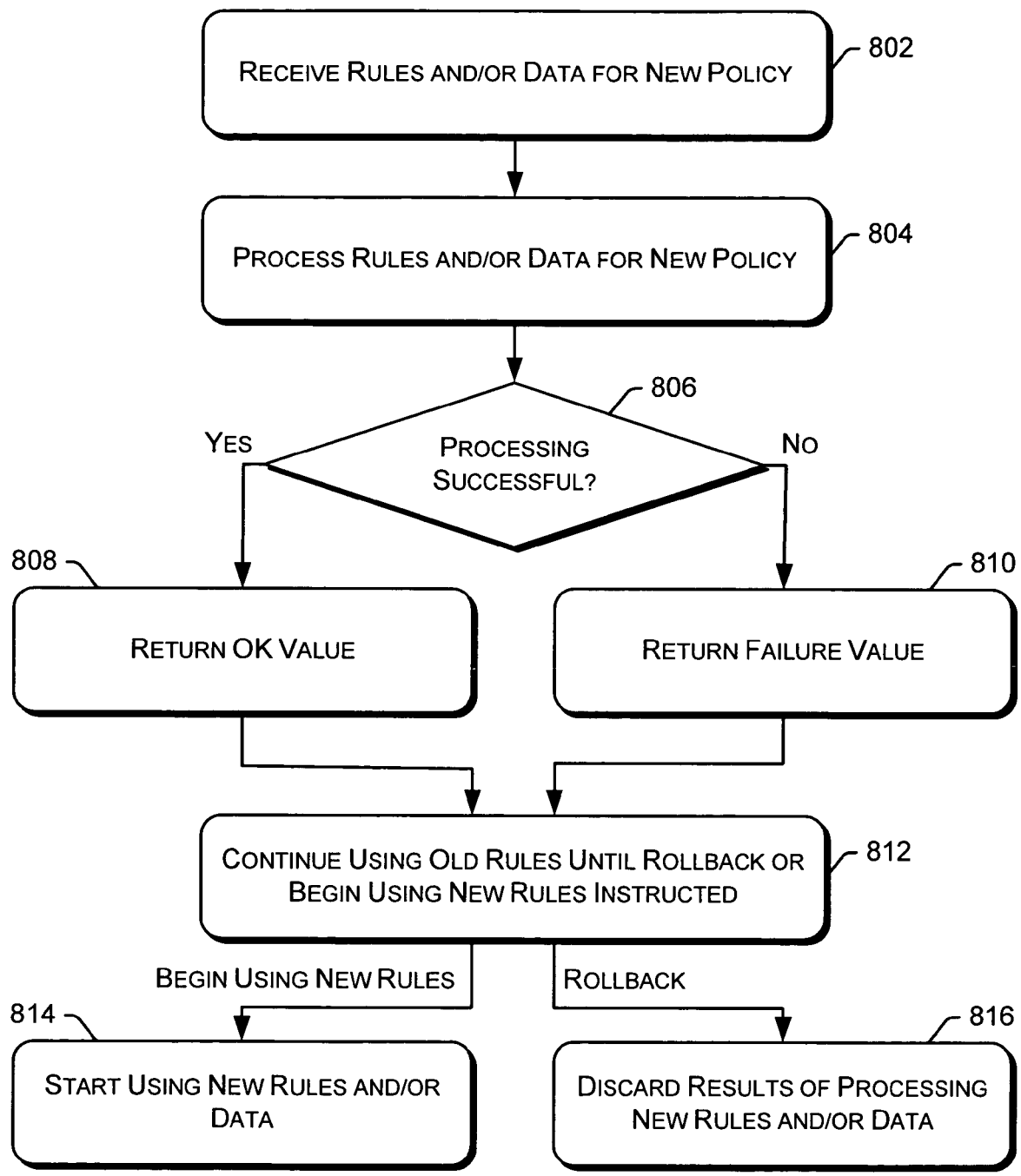
FIG. 8 is a flow diagram illustrating another embodiment of a procedure for updating a security policy.

FIG. 8 is a flowchart illustrating another example process 800 for updating a security policy. Process 800 is implemented by a security engine on a device, such as a security engine 114-118 on host computer 102 of FIG. 1. Process 800 may be performed in software, hardware, firmware, or combinations thereof.

Initially, a new set of rules and/or data are received for the new policy to be enforced (block 802). As discussed above, the rules and data may be received at substantially the same time, or alternatively the security engine may obtain data from a data store (e.g., the dynamic rules data store discussed herein) as needed. The new rules and/or data are then processed (block 804). Processing of the new rules and/or data creates an internal set of rules for the security engine to follow (e.g., in an internal format of the security engine) in enforcing the new security policy.

Process 800 proceeds based on whether the processing of the rules was successful (block 806). If the security engine has finished processing the set of rules and/or data that it received and is ready to begin using the new set of rules and/or data (e.g., all that remains is for the security engine to change its pointer to point to the new set of rules rather than the previous set of rules), then the processing was successful. Otherwise, the processing was not successful. If the processing was successful than a value signifying "OK" is returned (block 808). However, if the processing was not successful then a value signifying "Fail" is returned (block 810). The return values in blocks 808 and 810 are returned to a component(s) that is coordinating the updating of the security policy on the host computer (e.g., the rule manager discussed herein).

Regardless of the value returned, the security engine continues to use the previous or old set of rules until instructed to rollback or begin using new rules (block 812). If instructed to begin using the new rules, then the security engine begins using the new rules and/or data (block 814), such as by changing a pointer from its previous set of rules to its new set of rules. The instruction to begin using the new rules can be received by the security engine in any of a variety of manners, as discussed above.

However, if instructed to rollback, then the security engine discards any results of processing the new rules and/or data (block 816). This discarding can be performed regardless of whether the security engine has finished processing the new set of rules it received.

Thus, as can be seen in FIG. 8, the security engine continues to use its previous set of rules until an indication to switch to the new rules is received. By the time such an indication is received, the security engine is ready to begin using the new rules, and very little time is required for the switch to occur. For example, the security engine may simply need to switch a pointer to point to its new set of rules rather than its previous set of rules.

Application Program Interface (API)

An API, such as API 124 discussed above with respect to FIG. 1, permits the communication of security policies and event information among various components and programs (e.g., security engines) in the host computer. In one embodiment the API is defined using the Component Object Model (COM). The API supports methods for loading and unloading security engines, sending security policies to security engines, communicating changes in security policy data to interested security engines, allowing the host user to interact with the security engine at decision-making time to allow or disallow certain policy-specified behaviors, and centralized configuration management for the security engines.

The systems and procedures discussed herein enable the security of a computing system to be centrally managed by targeting security policies to a particular computing system or a group of computing systems. Additionally, these systems and procedures collect and correlate events and other information, such as security-related events, generated by those computing systems or other data sources.

In one embodiment, the interface supports client access to security policies and event databases via secure, authenticated protocols. The interface permits the communication between various components or application programs and one or more security engines. The interface also defines how the security engines communicate with each other and with other devices, components, services, or programs.

In one embodiment, the interface is defined as a COM interface, using a custom loader to reduce the likelihood of an attacker switching security engines for the attacker's own code by changing the COM registry values.

In an example embodiment, the function calls supported by the API are:

Agent-to-Security Engine Function Calls
Initialize
Shutdown
PreparePolicy
CommitPolicy
RollbackPolicy
WriteData
WriteConfig These seven function calls are referred to as the "ISecurityEngine interface".

Security Engine-to-Agent Function Calls
ReadAndRegisterNotifyData
WriteSEData
UnRegisterNotifyData
GetDataAttribute
ReadAndRegisterNotifyConfig
UnRegisterNotifyConfig
QueryUser
Complete The first seven function calls above are referred to as the "ISecurityAgent interface" and the last function call (Complete) is referred to as the "IAgentCallback interface".

A function call may also be referred to as a "call", "method", "function", or "service". Details regarding these function calls are provided below. Alternate embodiments may use additional function calls and/or may omit one or more of the function calls discussed herein.

In one embodiment, an agent, such as an event manager or a security agent communicates with the security engines via the API. An agent may also be referred to as a "manager". In particular embodiments, the agent will not call a particular security engine when an API call is already outstanding. There are exceptions to this rule for the asynchronous API calls. In these cases, the permitted agent actions are defined below in state tables.

Initialize Function Call

This method is called once for each security engine that is known to the agent. The method is called during agent startup. The Initialize function call loads the security engine and allows it to perform initialization operations.

This method is called asynchronously in turn for each security engine by the agent, and the callbacks are processed as they are received. The agent will wait for all the callbacks to complete before continuing.

This method is defined as follows:

```
HRESULT Initialize(
    [in] ISecurityAgent *pAgent,
    [in] IAgentCallback *pCallback);
``` pAgent is a COM interface that can be used by the security engines to call back into the agent.

pCallback is the callback object defined below.

If the Initialize function call fails, or if it does not return in a reasonable amount of time, then Shutdown will be called. Due to possible race conditions, security engines handle Shutdown before Initialize has returned.

Shutdown Function Call

This method is called once for each security engine that was called to Initialize by the agent. The method allows the security engine to begin its shutdown processing. Even if Initialize failed, the agent calls Shutdown to allow the security engine to close any resources that were allocated. For example, this method allows the security engine to perform a complex shutdown that cannot be performed during DLL_PROCESS_DETACH handling.

Since this method may take a significant amount of time to complete, it uses a callback object to indicate that it has completed shutdown processing. When this method is called as a result of in-process system shutdown, the time available for processing to complete is limited, and the agent may be terminated by the system before the callback is completed.

This method is defined as follows:

```
typedef enum tagSHUTDOWN_TYPE
{
    SHUTDOWN_NORMAL = 0,
    SHUTDOWN_SYSTEM
} SHUTDOWN_TYPE;
HRESULT Shutdown(
    [in] SHUTDOWN_TYPE eType,
    [in] IAgentCallback *pCallback );
``` eType is an enumeration of either SHUTDOWN_NORMAL or SHUTDOWN_SYSTEM.

pCallback is the callback object defined below.

DLL Unload will occur after the Shutdown callback has been made (or the timeout has occurred). Since the callback can be made asynchronously, the agent may have to wait for the thread that made the callback to exit before continuing to unload the security engine DLL. This allows the callback stack frame to unwind to a point outside the DLL that will be unloaded and avoid an exception in the process. If the callback is made during the Shutdown call, this extra step is not necessary, because the security engine threads are assumed to be shutdown.

Errors are logged as operational events but otherwise ignored, because the Agent is about to close down anyway.

PreparePolicy Function Call

This method is called by the agent when it receives an updated policy. The resulting policies are merged and each RuleSet is built to pass to the correct security engine. The XML data is passed as an IStream object that can be used by MSXML (Microsoft XML)—either DOM (Document Object Model) or SAX (Simple API for XML)—to read the XML data. This method is defined as follows:

```
HRESULT PreparePolicy(
    [in] IStream *pstreamRuleset,
    [in] IAgentCallback *pCallback);
``` pstreamRuleset is a COM interface to a Stream object that allows reading of the XML Rule Set. This IStream can be assumed to be local to the machine and not accessing data across the network.

pCallback is the callback object defined below.

If the call returns an error, the security engine is assumed to be continuing to run the previously-applied policy (which may be a boot-time policy). The agent calls a RollbackPolicy for all security engines whose PreparePolicy succeeds, but not for any failing security engine. This process is started as soon as any security engine returns an error. In addition, if the PreparePolicy callback does not arrive in a timely manner, the agent treats this as a failure on the part of that security engine. Therefore, security engines assume that the agent can call RollbackPolicy before the PreparePolicy call has returned.

CommitPolicy Function Call

This method is called by the agent when all the security engines have returned success on PreparePolicy calls. This call causes them to switch to the new policy. This method is defined as follows:

```
HRESULT CommitPolicy(void);
```

This call is synchronous, and the agent will wait for one call to complete before moving on to the next call. In one embodiment, it is expected that all the work that could fail a policy update is performed in the PreparePolicy call and this call is a simple switch from the old to the new policy data structures.

The CommitPolicy method returns catastrophic failures, such as a failure of communications between User and Kernel parts of the security engine. When this call does return an error, the agent attempts to reload the previous policy and re-apply that policy. Since there was an error, this may not work and the policy enforcement will be left in an unknown state. An operational error will be logged by the agent if CommitPolicy fails.

RollbackPolicy Function Call

This method is called by the agent when a security engine returns an error on its PreparePolicy call. This call causes the agent to call all the other security engines to abort the update and revert to the in-force policy. This method is defined as follows:

```
HRESULT RollbackPolicy(void);
```

This call is asynchronous because the rollback processing expected of the security engines is extensive, roughly mirroring that in handling PreparePolicy. When the security engine is done processing this call, the security engine calls Complete to indicate the status of the rollback.

If policy is rolled back, any data registered following PreparePolicy is deregistered by the agent—the system is rolled back to the previous set of data subscribed by each security engine. For this reason, the security engines do not discard their local copies of orphaned data until they receive the CommitPolicy call from the agent. The agent is responsible for handling the timing window where ReadAndRegisterData calls from security engines arrive during policy rollback.

RollbackPolicy and the Complete callback may return catastrophic failures. It is expected that security engines implement PreparePolicy such that rollback can be supported. An operational error is logged by the agent when RollbackPolicy fails. No assumption can be made about the state of policy enforcement by that security engine and any cooperating security engines after this happens. Future policy updates will continue to be sent to the security engine.

WriteData Function Call

This method is called by the agent when a piece of data that the security engine has previously called ReadAndRegisterNotifyData for changes. The parameters are similar to the ReadAndRegisterNotifyData call, except that the memory ownership belongs with the agent, so the security engine must not delete the item once it is processed.

WriteData is not called when the security engine is in the process of receiving a new policy from the agent; i.e., between calls to PreparePolicy and CommitPolicy/RollbackPolicy. Any data changes detected by the agent at this time are batched up and sent down to the interested security engines once the new policy has been committed or rolled back. The queue of pending updates is optimized by the agent to avoid as far as possible communicating multiple consecutive changes to the same piece of data. The WriteData method is defined as follows:

```
#define DF_DYNAMIC 0x1
#define DF_COLLECTION 0x2
#define DF_BOOLEAN 0x4
#define DF_PERSISTED 0x8
HRESULT WriteData(
    [in] REFGUID guidDataID,
    [in] DWORD dwFlags,
    [in] DWORD dwDataSize,
    [in] VARIANT varData,
    [in] DWORD dwKeySize,
    [in] byte *pbKeyValue);
```

The parameters for passing a Key (dwKeySize, pbKeyValue) are used when passing context associated with a previous query back to the security engine. The security engine uses this context to correlate the result of the query with a previous QueryUser call that it issued to the agent. This extra data is necessary because a given query may occur multiply for different contexts in the same rule—for example, asking the user whether application X is allowed to modify a registry value, then later asking the same question about application Y.

Errors are logged as Operational Events but otherwise ignored. Future updates to the same piece of data will still be notified to the failing security engine. If the security engine wishes to prevent this, it can call UnRegisterNotifyData for that piece of data.

WriteConfig Function Call

This method allows the agent to distribute configuration data to interested security engines. Once a security engine has read the configuration data using the ReadAndRegisterNotifyConfig method, it will be informed of changes to that data by the agent calling this method. The method is defined as follows:

```
HRESULT WriteConfig(
    [in] WCHAR *wszDataName,
    [in] VARIANT varData);
``` wszDataName is the Text name of the configuration data item being written, and is the name used in the registry for this data.

varData is the variant structure that contains the single data item that the name represents. This data can be of various types, depending on what the type of the data is in the registry. The agent does no type checking—the security engine is expected to check the data type as it requires, according to the context.

Errors are logged as Operational Events but otherwise ignored. Future updates to the same configuration parameter data will still be notified to the failing security engine. If the security engine wishes to prevent this, it should call UnRegisterNotifyConfig for that piece of data.

A particular security engine does not typically call the agent while an API call from that agent is already outstanding. The agent treats this as an error and ignores the second call.

ReadAndRegisterNotifyData Function Call

This method allows a security engine to read data from the dynamic rules data subsystem for use in their rules processing. Once a security engine has read the data, it will be informed of changes to that data by the agent calling the WriteData method of the ISecurityEngine interface. The method is defined as follows:

```
HRESULT ReadAndRegisterNotifyData(
    [in] REFGUID guidDataID,
    [out] DWORD *pdwFlags,
    [out] DWORD *pdwDataSize,
    [out] VARIANT *pvarData);
``` guidDataID is the GUID of the data item to retrieve.

pdwFlags is a set of flags that describe the data item. Example values can be DYNAMIC or STATIC as well as COLLECTION or BOOLEAN.

pdwDataSize is the total size of the Data Items in the array that is returned in the variant data.

pvarData is the variant structure that contains a reference to the array of data items, or the data item value for Boolean data types. The variant is empty on input.

It is an error for a security engine to ask for data that is no longer in the policy. The agent will generate an Operational Event on any error. In this case, there is no guarantee that the security engine and the agent have a consistent view of the affected data.

WriteSEData Function Call

This method is called by the security engine when a piece of data changes that the security engine owns and publishes (for persistence, or use by other security engines. The parameters are similar to the WriteData call, except that the memory ownership belongs with the security engine, so the agent does not delete the item once it is processed. The method is defined as follows:

```
HRESULT WriteSEData(
    [in] REFGUID guidDataID,
    [in] DWORD dwDataSize,
    [in] VARIANT varData);
```

This method can be called at any time, including while another WriteSEData call is still outstanding, on any thread. It is the agent's responsibility to ensure serialization, if necessary.

The owner of a data item is identified in the collection definition by a GUID that defines the owner. This could be the GUID of a security engine or an identifier for the agent, or possibly an identifier for another consumer.

If a security engine defines a collection that it owns, it is assumed that the data will be published to the agent via this API.

The agent will log any error as an Operational Event. The security engine can decide whether or not to continue providing updates after an error. There is no guarantee that the agent's version of the data is consistent with the security engine's view after an error.

UnRegisterNotifyData Function Call

This method allows a security engine to stop receiving WriteData notifications for data items it is no longer interested in. The method is defined as follows:

```
HRESULT UnRegisterNotifyData(
    [in] REFGUID guidDataID);
``` guidDataID is the GUID identifying the data item for which the security engine is no longer interested in change notifications. The security engine can indicate that it wishes to deregister all current notifications by passing in the Null GUID {00000000-0000-0000-000000000000}.

The agent will log any error as an Operational Event. This includes the case where the data is not known to the agent, to assist with diagnosis of policy management problems.

GetDataAttribute Function Call

This method allows a security engine to retrieve a particular attribute associated with a data item. The attribute name is the same as the name that is in the Policy XML, including the case of the text. Attribute values can only change when a policy is changed, so there is no notification system needed for this data. The method is defined as follows:

```
HRESULT GetDataAttribute(
    [in] REFGUID guidDataID,
        [in] WCHAR *wszAttributeName,
    [out] VARIANT *pvarAttributeValue);
```

This method can be called at any time.

guidDataID is the GUID identifying the data item to retrieve the attribute for.

wszAttributeName is the name of the attribute, exactly as it is in the policy document.

pvarAttributeValue is the attribute value as a Variant. Normal output parameter allocation rules apply. The agent allocates a new Variant with the information and it is the caller's responsibility to free it later.

ReadAndRegisterNotifyConfig Function Call

This method allows a security engine to read configuration data from the agent. Once a security engine has read the configuration data, it will be informed of changes to that data by the agent calling the WriteConfig method of the ISecurityEngine interface.

Configuration data for the agent and its hosted security engines may be located under a common root. The method is defined as follows:

```
HRESULT ReadAndRegisterNotifyConfig(
    [in] WCHAR *wszDataName,
    [out] VARIANT *pvarData);
``` wszDataName is the Text name of the configuration data item to retrieve, and is the name used in the registry for this data. This identifies the individual item relative to the common agent root. No leading '\' character is required. The value is case-insensitive, but whitespace characters are significant.

pvarData is the variant structure that contains the single data item that the name represents. This data can be of various types, depending on what the type of the data is in the registry. The agent does no type checking—the security engine is expected to check the data type as it requires, according to the context.

The agent will log any error as an Operational Event.

UnRegisterNotifyConfig Function Call

This method allows a security engine to stop receiving WriteConfig notifications for data items it is no longer interested in. The method is defined as follows:

```
HRESULT UnRegisterNotifyConfig(
    [in] WCHAR *wszDataName);
``` wszDataName is the Text name identifying the configuration data item for which the security engine is no longer interested in change notifications.

The agent will log any error as an Operational Event. This includes the case where the data is not known to the agent, to assist with diagnosis of configuration management problems.

QueryUser Function Call

This method allows a security engine to ask the agent to display a specific message to the user, returning the answer that the user selected. The agent can also cache this answer, and persist that value over agent re-starts. The question that the user is presented with can contain specific information about why the user is being asked this question. This information can be provided by the security engine and can be different each time this method is called. How the agent decides whether this question has been asked before and what the answer is, is determined by the Key Information that the security engine provides.

The call returns to the security engine immediately. The security engine then suspends the operation of the session/thread that triggered this query until it is notified of a response. This happens when the user keys in a response, or when the Query times out. The timeout processing is handled by the agent. At this point, the agent updates the relevant data-item with the keyed or default response, and notifies the security engine of the result with its associated context.

Since obtaining a response to such queries is time-critical, this API can be called at any time by a security engine that is enforcing a rule requiring a query to be issued. The method is defined as follows:

```
HRESULT QueryUser(
    [in] REFGUID guidQueryItem,
    [in] DWORD dwKeySize,
    [in] byte *pbKeyValue,
    [in] SAFEARRAY(VARIANT) pvarQueryParams);
``` guidQueryItem is the GUID of the data item that contains the base strings that are used to ask the user the question, and provide the possible answers to that question.

dwKeySize is the length of the Key Value, in bytes.

pbKeyValue is the set of bytes that define the unique key for this query.

pvarQueryParams is a Safearray of Variants containing the query parameters to be substituted into the query text that is displayed to the user. The order and syntax of the parameters is defined by the rule type with which this QueryUser action is associated.

The agent will return an error if the data item is not identifiable. Errors in executing the query will be logged as Operational Events. In this case, the default action is returned to the security engine.

Complete Function Call

This method notifies the agent that a security engine has completed processing associated with a prior asynchronous call from the agent to that security engine. Although a particular security engine can potentially have more than one asynchronous calls from the agent outstanding, the agent manages internal state for each security engine such that the context of a particular Complete callback is unambiguous. The method is defined as follows:

```
HRESULT Complete(
    [in] HRESULT hrCompletionCode);
``` hrCompletionCode is the return code for the asynchronous call the agent previously made to this security engine.

Interface Usage

The following describes example restrictions on how these APIs are used to interact with one or more security engines.

At a particular time, the security engine is in a certain state with respect to its interactions with the agent. The following list identifies possible security engine states.

| State | Definition |
|---|---|
| Pending_Initialize | The security engine DLL has been loaded but no API calls received yet. The Policy state at this point depends on the security engine - NSE has a boot-time policy, behavioral blocking has none until it is given rules by the agent. |
| Initializing | Initialize has been called but not completed |
| Running | The security engine has called back the agent to say it Initialized successfully, and is enforcing either (initially) boot-time or (after subsequent CommitPolicy) agent-supplied policy |

-continued

| State | Definition |
|---|---|
| Preparing_Policy | PreparePolicy has been called but no callback has happened |
| Policy_Prepared | PreparePolicy callback completed with success return code, waiting for CommitPolicy call |
| Policy_Rollback | Security engine called with RollbackPolicy, processing the rollback request |
| Shutting_Down | Shutdown has been called but not completed |
| Pending_Termination | Shutdown complete - waiting for process termination |

The permitted interactions between the agent and security engines can be formalized as a set of tables which define the APIs that can be called by each entity when a security engine is in a particular state, and what state change or other action needs to be taken by the security engine as a result. The operational state of the agent is assumed to be unimportant—the security engines can assume it remains in normal operation at all times while the security engines are loaded into memory.

The state tables cover the following phases of the security engine's lifecycle:

Initialization

Policy Update from agent

Shutdown

Any combination of API call and security engine state not covered in these tables can be considered a misuse of the API. It is the responsibility of the API caller to avoid such misuse.

The following state table defines the permitted sequences of APIs during security engine initialization, and security engine state changes according to inputs from the agent. A call to any API not listed as a permitted input for the list of states associated with security engine initialization implies a protocol error on the calling entity's part.

| | Pending_Initialize | Initializing |
|---|---|---|
| Security Engine State Agent API Calls | | |
| Initialize | Initializing | ERROR |
| Shutdown | ERROR | Pending_Termination |
| WriteConfig | ERROR | OK |
| Security Engine API Calls | | |
| Complete(OK) | ERROR | Running (no policy) |
| Complete(FAIL) | ERROR | Pending_Termination |
| ReadAndRegisterNotify Config | ERROR | OK |

The following state table defines the permitted sequences of APIs during policy update, and the associated security engine state changes. A call to any API not listed as a permitted input here for the list of states associated with policy update implies a protocol error on the calling entity's part.

| Security Engine State Agent API Calls | Running | Preparing_Policy |
|---|---|---|
| PreparePolicy | Preparing_Policy | ERROR |
| WriteConfig Security Engine API Calls | OK | OK |
| Complete(OK) | ERROR | Policy_Prepared |
| Complete(FAIL) | ERROR | Running (old policy) |
| ReadAndRegisterNotifyConfig | OK | OK |
| ReadAndRegisterNotifyData | OK | OK |

| | Policy_Prepared |
|---|---|
| Security Engine State Agent API Calls | |
| CommitPolicy | Running (new policy) |
| RollbackPolicy | Policy_Rollback (old policy) |
| WriteConfig Security Engine API Calls | OK |
| Complete(OK) | ERROR |
| Complete(FAIL) | ERROR |
| ReadAndRegisterConfig | OK |
| ReadAndRegisterData | OK |

An example of the overall policy update sequence, taking into account multiple hosted security engines, is described below.

1. Each security engine's PreparePolicy is called.

2. The agent waits for each security engine to call Complete with Success or a Failure.

3. If any security engine reports a failure, every other security engine will have their RollbackPolicy method called.

4. If no security engine reports a failure, the CommitPolicy method is called for each security engine.

5. If another failure is discovered, or if a Shutdown is necessary, before any CommitPolicy methods are called, the RollbackPolicy method is called for each security engine.

The following state table defines the permitted sequences of APIs during security engine shutdown, and security engine state changes according to inputs from the agent. A call to any API not listed as a permitted input here for the list of states associated with security engine shutdown implies a protocol error on the calling entity's part.

| SE State Agent API Calls | Initializing, Running, Preparing_Policy, Policy_Prepared, Policy_Rollback | Shutting_Down |
|---|---|---|
| Shutdown SE API Calls | Shutting_Down | ERROR |
| Complete | ERROR | Pending_Termination |

Listed below are example collection types supported by the agent, and descriptions regarding how each collection is passed as dynamic data through the ReadAndRegisterNotifyData and WriteData method calls.

Many of the data items discussed below can be handled by passing a single BSTR string, or packing unsigned integers into a LONG or a LONGLONG variant type. Those items that don't easily fit this model are: DirectorySet, ProtocolSet and IPv4AddressSet. For each of these types a packing system is suggested that packs the data into a BSTR string to allow easy transfer in a SafeArray.

FileSet
Data passed for each item:
Filename—string
Implementation:
BSTR
DirectorySet
Data passed for each item:
Directory Name—String
Recursive—Flag
Implementation:
Packed BSTR—"Recursive Flag:String"
Recursive Flag is a single character—
'R'—Recursive
'F'—Flat
RegistrySet
Data passed for each item:
Registry Key Name—String
Implementation:
Packed BSTR—"Recursive Flag:String"
Recursive Flag is a single character—
'R'—Recursive
'F'—Flat
Protocol
Data passed for each item:
Primary/Secondary—String or Enumeration
IP Type—String or Enumeration
Direction—String or Enumeration
Port or Port Range—One or Two Integers (16 bit, unsigned integers)
Implementation:
Packed LONGLONG:
    1 Byte—Primary/Secondary
    1 Byte—IP Type TCP/UDP
    1 Byte—Direction In/Out/Both
    1 Byte—Unused
    2 Bytes—Port Range End (or Zero)
    2 Bytes—Port Range Start (or Port)
ProcessSet
Data passed for each item:
Process Name or Path—String
Implementation:
BSTR
NetworkPortSet
Data passed for each item:
Port or Port Range—One or Two Integers (16 bit, unsigned integers)
Implementation:
Packed LONG: Start=Low Word, End=High Word. High Word is Zero if not a Port Range
NetworkIPv4AddressSet
Data passed for each item:
One of:
    IPv4 Address—String (can contain wildcards)
    IPv4 Address Range—2 Strings
    FQDN—String
    Hostname—String Implementation:
Packed BSTR: "T:String 1:String 2"
 T—Type—One Character for Address, Address Range, HostName or FQDN
 String 1—Address, Start Address, HostName or FQDN
 String 2—End Address for Address Range
UserSet
Data passed for each item:
User Account Name—String
Implementation:
BSTR
UserGroupSet
Data passed for each item:
User Group Name—String
Implementation:
BSTR
FileOpSet
Data passed for each item:
File Operation—String (or Enumeration)
Implementation:
BSTR
DirOpSet
Data passed for each item:
Directory Operation—String (or Enumeration)
Implementation:
BSTR
ProcessOpSet
Data passed for each item:
Process Operation—String (or Enumeration)
Implementation:
BSTR
RegKeyOpSet
Data passed for each item:
Registry Key Operation—String (or Enumeration)
Implementation:
BSTR
RegValueOpSet
Data passed for each item:
Registry Value Operation—String (or Enumeration)
Implementation:
BSTR
UserOpSet
Data passed for each item:
User Account Operation—String (or Enumeration)
Implementation:
BSTR
UserGroupOpSet
Data passed for each item:
User Group Operation—String (or Enumeration)
Implementation:
BSTR
JobOpSet
Data passed for each item:
Job Operation—String (or Enumeration)
Implementation:
BSTR
Generic
Data passed for each item:
Value—String
Implementation:
BSTR
QuerySet To the security engine, QuerySet appears as a single item collection that contains the result of a query to the user. The associated context is passed to the security engine as a separate parameter. The internal structure of the QuerySet is not typically needed by a security engine, only the context and the query result.
Boolean (boolDefine)
Data passed for the single item:
Boolean—True or False
Implementation:
LONG—False=0, True=1

Figure 9:
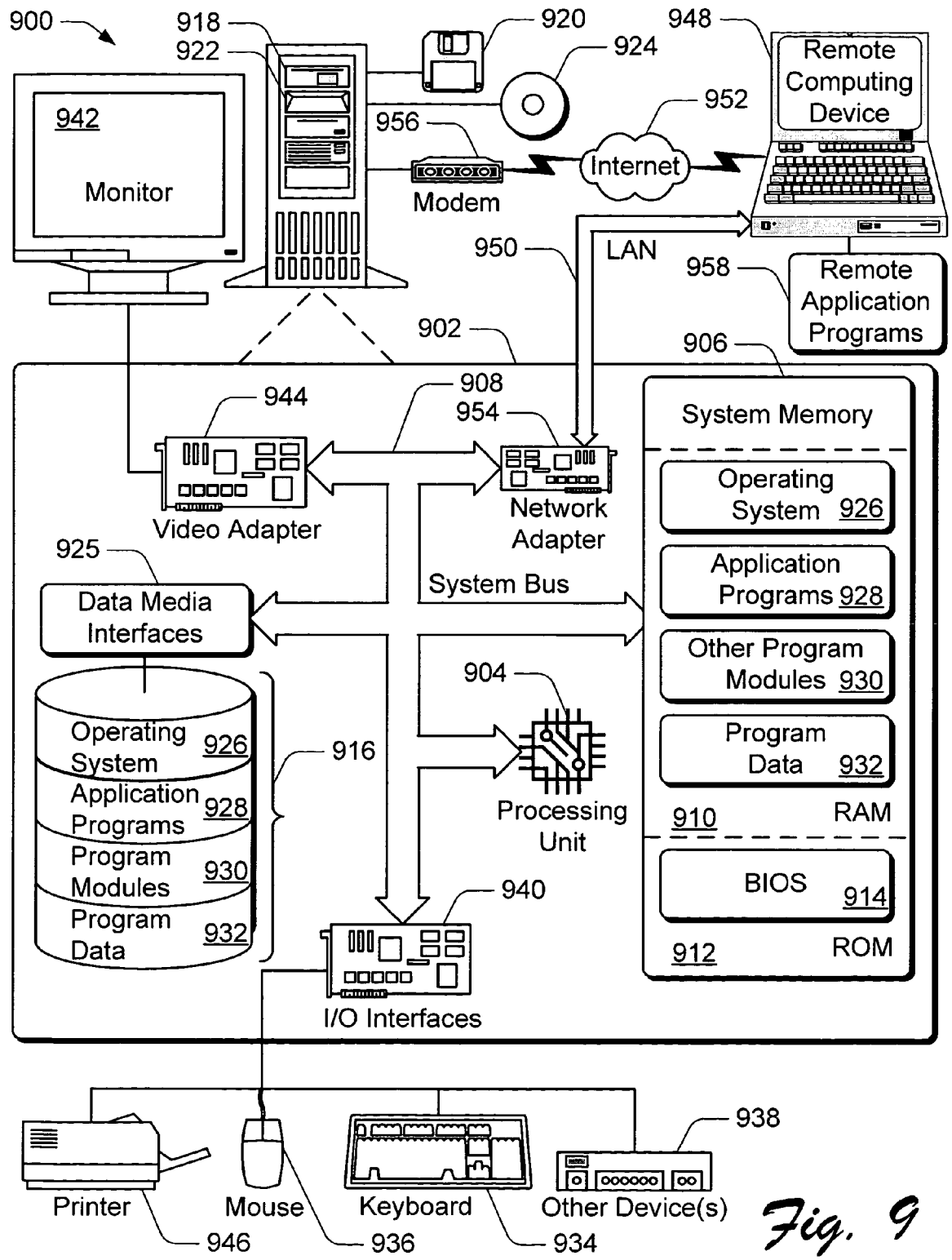
FIG. 9 illustrates a general computer environment.

FIG. 9 illustrates a general computer environment 900, which can be used to implement the techniques described herein. The computer environment 900 is only one example of a computing environment and is not intended to suggest any limitation as to the scope of use or functionality of the computer and network architectures. Neither should the computer environment 900 be interpreted as having any dependency or requirement relating to any one or combination of components illustrated in the example computer environment 900.

Computer environment 900 includes a general-purpose computing device in the form of a computer 902. One or more media player applications can be executed by computer 902. The components of computer 902 can include, but are not limited to, one or more processors or processing units 904 (optionally including a cryptographic processor or co-processor), a system memory 906, and a system bus 908 that couples various system components including the processor 904 to the system memory 906.

The system bus 908 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may implement all or part of the resident components that support the distributed file system.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, game console, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 10:
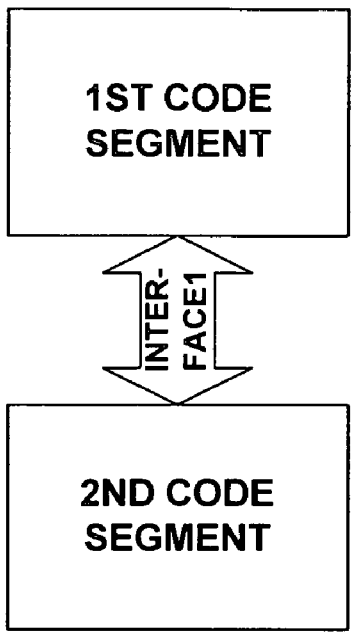
FIGS. 10-21 illustrate various example implementations of a programming interface.
Figure 11:
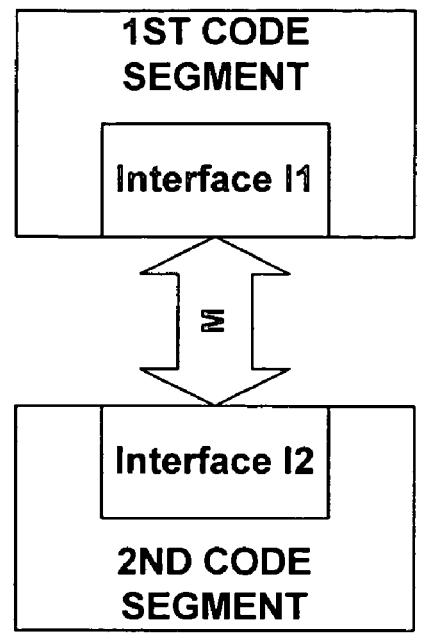

Notionally, a programming interface may be viewed generically, as shown in FIG. 10 or FIG. 11. FIG. 10 illustrates an interface Interface1 as a conduit through which first and second code segments communicate. FIG. 11 illustrates an interface as comprising interface objects I1 and I2 (which may or may not be part of the first and second code segments), which enable first and second code segments of a system to communicate via medium M. In the view of FIG. 11, one may consider interface objects I1 and I2 as separate interfaces of the same system and one may also consider that objects I1 and I2 plus medium M comprise the interface. Although FIGS. 10 and 11 show bi-directional flow and interfaces on each side of the flow, certain implementations may only have information flow in one direction (or no information flow as described below) or may only have an interface object on one side. By way of example, and not limitation, terms such as application programming or program interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 10 and 11, but they nonetheless perform a similar function to accomplish the same overall result. We will now briefly describe some illustrative alternative implementations of a programming interface.

Factoring

Figure 12:
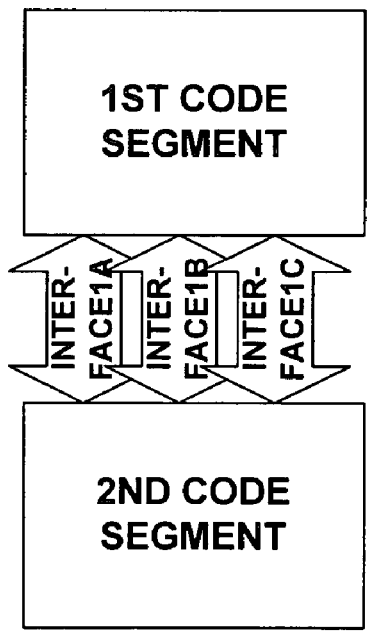
Figure 13:
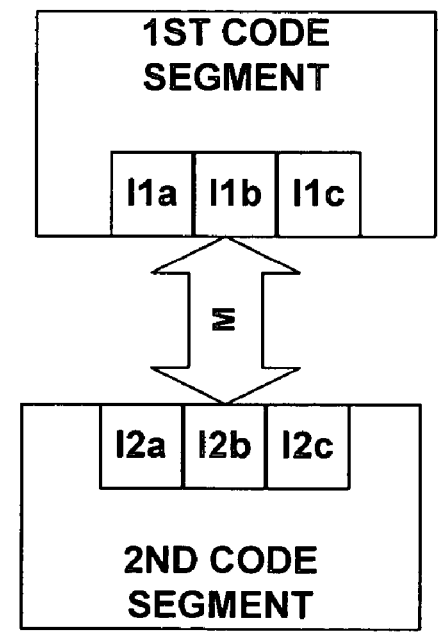

A communication from one code segment to another may be accomplished indirectly by breaking the communication into multiple discrete communications. This is depicted schematically in FIGS. 12 and 13. As shown, some interfaces can be described in terms of divisible sets of functionality. Thus, the interface functionality of FIGS. 10 and 11 may be factored to achieve the same result, just as one may mathematically provide 24, or 2 times 2 times 3 times 2. Accordingly, as illustrated in FIG. 12, the function provided by interface Interface1 may be subdivided to convert the communications of the interface into multiple interfaces Interface1A, Interface 1B, Interface 1C, etc. while achieving the same result. As illustrated in FIG. 13, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. 12 and 13, the functional spirit of interfaces Interface1 and I1 remain the same as with FIGS. 10 and 11, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Redefinition

Figure 14:
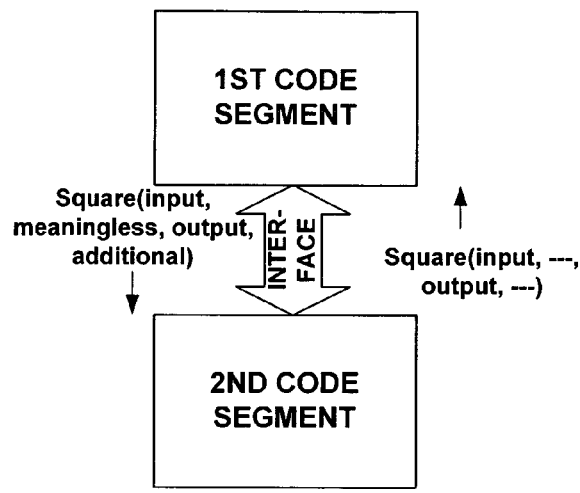
Figure 15:
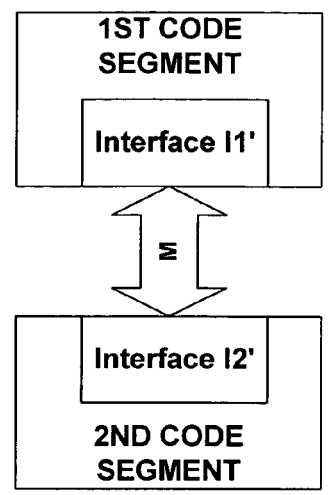

In some cases, it may be possible to ignore, add or redefine certain aspects (e.g., parameters) of a programming interface while still accomplishing the intended result. This is illustrated in FIGS. 14 and 15. For example, assume interface Interface1 of FIG. 10 includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 14, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 15, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Inline Coding

Figure 16:
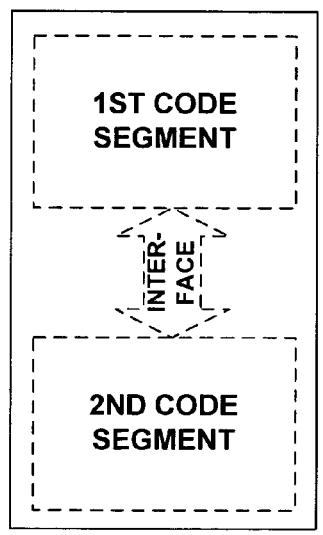
Figure 17:
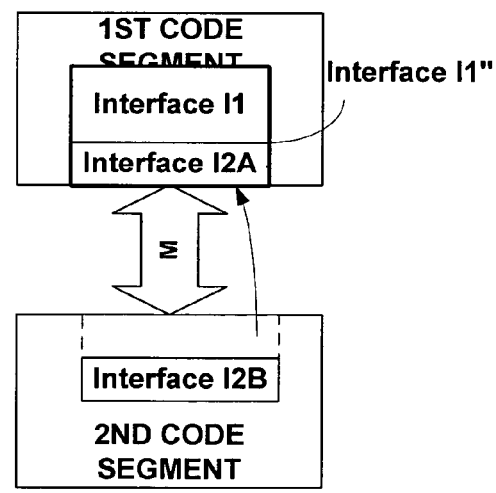

It may also be feasible to merge some or all of the functionality of two separate code modules such that the "interface" between them changes form. For example, the functionality of FIGS. 10 and 11 may be converted to the functionality of FIGS. 16 and 17, respectively. In FIG. 16, the previous $1^{st}$ and $2^{nd}$ Code Segments of FIG. 10 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 17, part (or all) of interface I2 from FIG. 11 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 11 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Divorce

Figure 18:
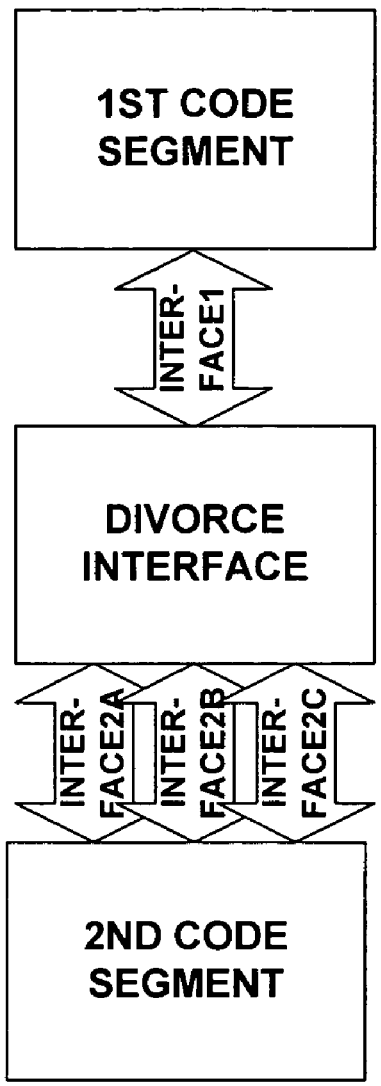
Figure 19:
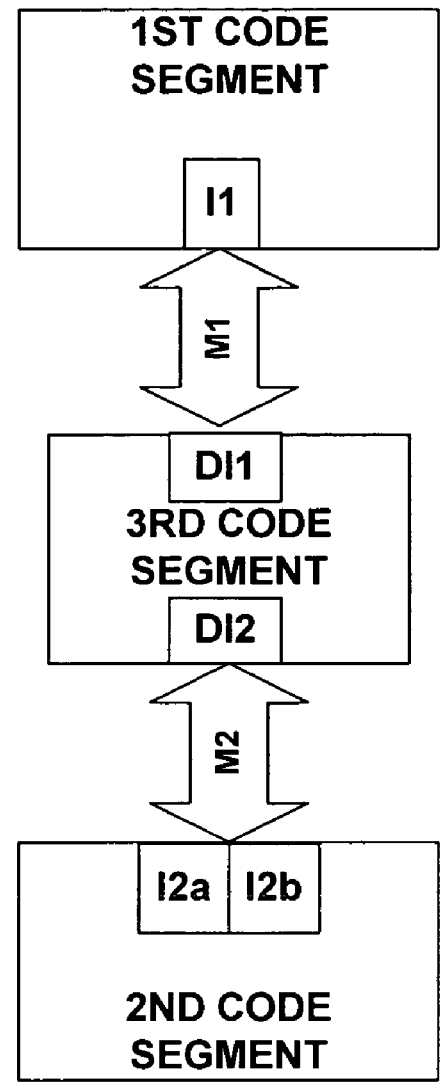

A communication from one code segment to another may be accomplished indirectly by breaking the communication into multiple discrete communications. This is depicted schematically in FIGS. 18 and 19. As shown in FIG. 18, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 19, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 11 to a new operating system, while providing the same or similar functional result.

Rewriting

Figure 20:
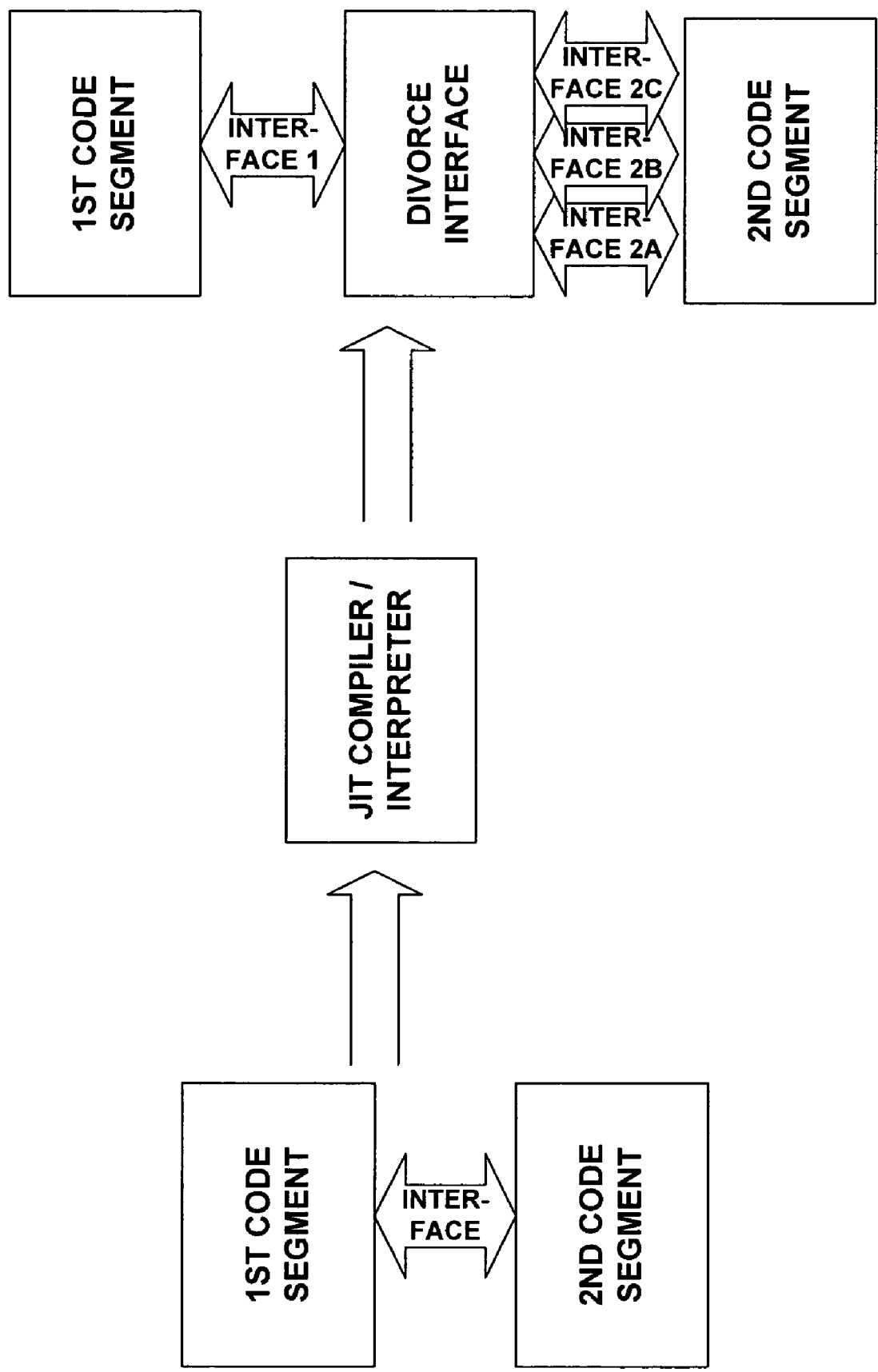
Figure 21:
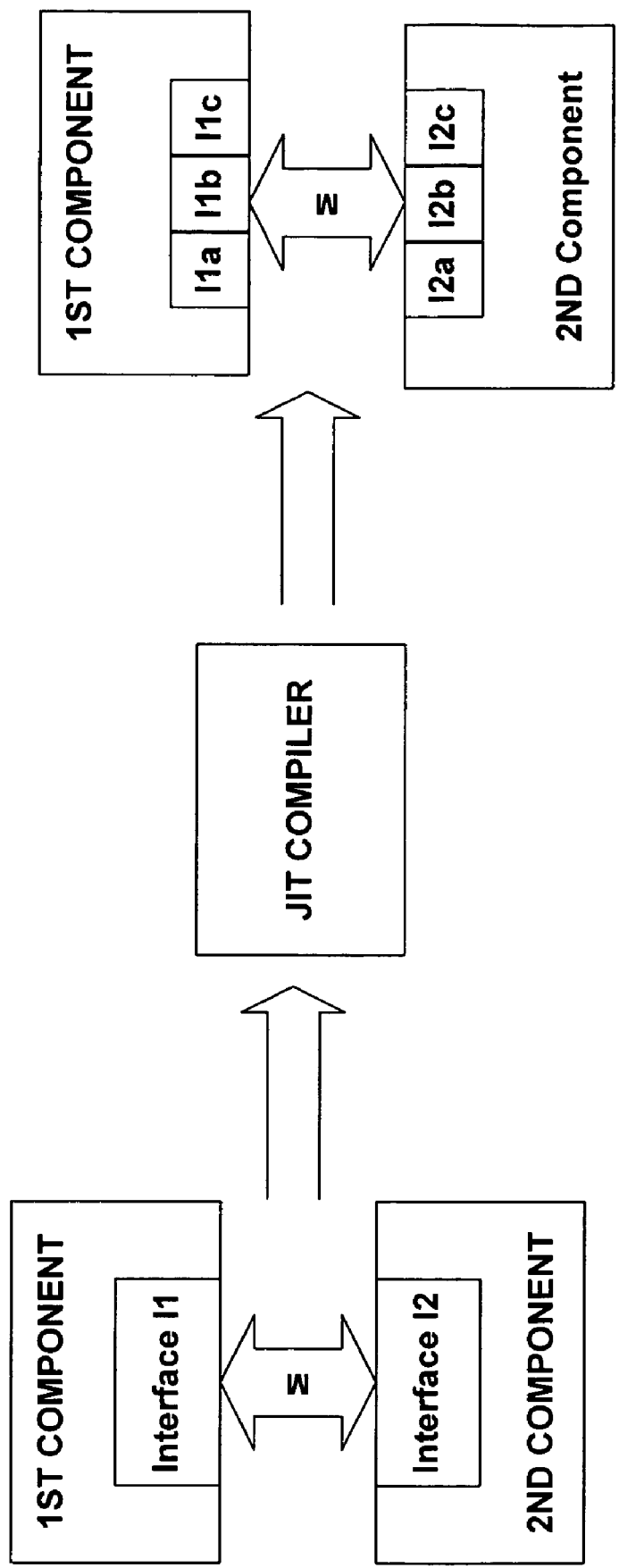

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 20 and 21. As can be seen in FIG. 20, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 21, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 10 and 11. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A programming interface embodied on one or more computer storage media, comprising:
   instructions to communicate a new security policy to a plurality of security engines, wherein at least one of the plurality of security engines implements an antivirus service, wherein each of the plurality of security engines is configured to replace an existing security policy with the new security policy, and wherein a new set of rules and/or data associated with the new policy is provided to each security engine; and
   instructions to communicate an indication of each security engine's readiness to implement the new security policy, wherein each of the plurality of security engines returns a value signifying whether it has processed the new set of rules and/or data received to indicate readiness to implement the new security policy.

2. A programming interface as recited in claim 1 wherein the instructions to communicate a new security policy to a plurality of security engines include a method that instructs each of the plurality of security engines to delete the new security policy.

3. A programming interface as recited in claim 1 wherein the instructions to communicate a new security policy to a plurality of security engines include a method that initializes a particular security engine.

4. A programming interface as recited in claim 1 wherein the instructions to communicate a new security policy to a plurality of security engines include a method that instructs each of the plurality of security engines to implement the new security policy.

5. A programming interface as recited in claim 1 wherein the instructions to communicate a new security policy to a plurality of security engines further comprise a method that communicates new data associated with an existing security policy to at least one of the plurality of security engines.

6. A programming interface as recited in claim 1 wherein the instructions to communicate a new security policy to a plurality of security engines further comprise a method that communicates configuration information to at least one of the plurality of security engines.

7. A programming interface as recited in claim 1 wherein the instructions to communicate an indication of each security engine's readiness to implement the new security policy include a method that indicates whether a particular security engine has implemented the new security policy.

8. A programming interface as recited in claim 1 wherein the instructions to communicate an indication of each security engine's readiness to implement the new security policy further comprise a method that retrieves updated data associated with a particular security policy.

9. A programming interface as recited in claim 1 wherein the instructions to communicate an indication of each security engine's readiness to implement the new security policy further comprise a method that communicates new data identified by one of the plurality of security engines to a security agent.

10. A programming interface as recited in claim 1 wherein the instructions to communicate an indication of each security engine's readiness to implement the new security policy further comprise a method that allows one of the plurality of security engines to query a user of a system containing the plurality of security engines.

11. A programming interface as recited in claim 1 wherein at least one of the plurality of security engines implements a firewall application.

12. A programming interface as recited in claim 1 wherein the plurality of security engines implement the new security policy after all security engines have indicated a readiness to implement the new security policy.

13. A computer system including:
one or more microprocessors; and
one or more software programs, the one or more software programs utilizing an application program interface to implement a security policy on a plurality of security engines, wherein at least one of the plurality of security engines implements an antivirus service, the application program interface comprising the following functions:
a first function that communicates a new security policy to the plurality of security engines, wherein a new set of rules and/or data associated with the new policy is communicated;
a second function that identifies whether each of the plurality of security engines is prepared to apply the new security policy based on a value generated by each of the plurality of security engines signifying whether it has processed the new set of rules and/or data; and
a third function that instructs each of the plurality of security engines to implement the new security policy after determining that all of the security engines are prepared to apply the new security policy.

14. A computer system as recited in claim 13 further comprising a fourth function that causes each of the plurality of security engines to delete the new security policy if at least one of the plurality of security engines is unable to apply the new security policy.

15. A computer system as recited in claim 13 further comprising a fourth function related to communicating event information identified by a first security engine to the other security engines.

16. A computer system as recited in claim 13 further comprising a fourth function related to communicating security-related information identified by a first security engine to an event manager.

17. A computer system as recited in claim 16 wherein the event manager communicates the security-related information to at least one of the plurality of security engines.

18. A computer system as recited in claim 13 wherein at least one of the plurality of security engines is associated with a first type of security attack.

19. A computer system as recited in claim 18 wherein at least one of the plurality of security engines is associated with a second type of security attack.

20. A method comprising:
calling at least one of a plurality of first functions to facilitate communicating a security policy to a first security engine, wherein at least one of the plurality of security engines implements an antivirus service;
calling at least one of a plurality of second functions to facilitate determining whether the first security engine has applied the security policy; and
calling at least one of a plurality of third functions to facilitate communicating security-related information from the first security engine to a second security engine, wherein the first security engine communicates whether it is ready to apply the security policy.

21. A method as recited in claim 20 wherein the security-related information identifies a type of security attack.

22. A method as recited in claim 20 further comprising calling one or more fourth functions to facilitate interacting with a user of a system containing the first security engine.

23. A method as recited in claim 20 further comprising calling one or more fourth functions to facilitate communicating configuration information to the first security engine.

24. A method as recited in claim 20 further comprising calling one or more fourth functions to facilitate instructing the first security engine and the second security engine to implement the security policy.

25. A method as recited in claim 20 further comprising calling one or more fourth functions to facilitate communicating a revised security policy to the first security engine.

26. A system comprising:
means for storing instructions facilitating an application program interface implementing a security policy on a plurality of security engines;
means for defining a first function that communicates a security-related event to an event manager, wherein the security-related event is detection of a virus, and wherein the communication of the security-related event includes information or details of the event being communicated;
means for defining a second function that identifies a plurality of security engines associated with the security-related event, wherein the identified security engines are those security engines determined to be able to use the event information; and
means for defining a third function that communicates the security-related event from the event manager to the identified security engines thus each of the plurality of security engines need not know of the other security engines;
means for defining a fourth function that communicates a new security policy from the event manager to the plurality of security engines to increase security based on shared event information;
means for defining a fifth function that instructs the plurality of security engines to replace an existing security policy with the new security policy; and
means for defining a sixth function that communicates the ability of the plurality of security engines to replace an existing security policy with the new security policy.

27. A system as recited in claim 26 further comprising:
means for defining a seventh function that instructs the plurality of security engines to implement the new security policy if all of the plurality of security engines can implement the new security policy.

28. A system as recited in claim 27 further comprising means for defining a function that instructs the plurality to security engines to delete the new security policy if at least one of the plurality of security engines cannot implement the new security policy.

29. A system as recited in claim 26 comprising means for detecting the security related event wherein the security-related event further comprises an unauthorized attempt to access a storage device.

30. A system as recited in claim 26 further comprising means for defining a function that notifies the event manager that a particular security engine has finished processing another function call.

* * * * *